United States Patent
Wang et al.

(10) Patent No.: US 12,255,356 B2
(45) Date of Patent: Mar. 18, 2025

(54) BUSBAR ASSEMBLY AND ASSEMBLING METHOD THEREOF, ASSEMBLY TOOL AND BATTERY PACK

(71) Applicant: CALB Co., Ltd., Suzhou (CN)

(72) Inventors: Liujie Wang, Changzhou (CN); Hao Ma, Changzhou (CN); Pengfei Zhou, Changzhou (CN); Tinglu Yan, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 476 days.

(21) Appl. No.: 17/731,241

(22) Filed: Apr. 27, 2022

(65) Prior Publication Data

US 2023/0275324 A1    Aug. 31, 2023

(30) Foreign Application Priority Data

Feb. 28, 2022   (CN) .......................... 202210191288.X

(51) Int. Cl.
*H01M 50/503*   (2021.01)
*H01M 50/507*   (2021.01)

(52) U.S. Cl.
CPC ....... *H01M 50/503* (2021.01); *H01M 50/507* (2021.01)

(58) Field of Classification Search
CPC ......... H01M 10/0404; H01M 10/0422; H01M 50/213; H01M 50/503; H01M 50/507; H01M 50/509; H01M 50/528; H01M 50/559; Y02E 60/10; Y02P 70/50
See application file for complete search history.

(56) References Cited

U.S. PATENT DOCUMENTS

| | | |
|---|---|---|
| 2002/0006544 A1 | 1/2002 | Asaka et al. |
| 2014/0255750 A1 | 9/2014 | Jan et al. |
| 2020/0259154 A1 | 8/2020 | Jan et al. |

FOREIGN PATENT DOCUMENTS

| | | |
|---|---|---|
| CN | 205488902 | 8/2016 |
| CN | 107482147 | 12/2017 |
| CN | 207818806 | 9/2018 |
| CN | 210866323 | 6/2020 |
| CN | 112038521 | 12/2020 |

OTHER PUBLICATIONS

"Search Report of Europe Counterpart Application", issued on Apr. 20, 2023, p. 1-p. 9.
Office Action of China Counterpart Application, with English translation thereof, issued on Jun. 1, 2023, p. 1-p. 21.
"Office Action of China Counterpart Application", issued on Jan. 27, 2024, with English translation thereof, p. 1-p. 18.

*Primary Examiner* — Victoria H Lynch
(74) *Attorney, Agent, or Firm* — JCIP GLOBAL INC.

(57) ABSTRACT

A busbar assembly includes a first busbar configured to connect two adjacent battery units. The first busbar includes a first connection part and a second connection part. The first connection part is used to connect a first electrode terminal of one of the battery units. The second connection part is used to connect the second electrode terminal of the other one of the battery units, and the second connection part and the first connection part are in staggered arrangement. The first connection part and the second connection part of the first busbar are in staggered arrangement, to match a vertical distance between a lead surface of the second electrode terminal and a lead surface of the first electrode terminal on a same side of the battery units.

29 Claims, 16 Drawing Sheets

BUSBAR ASSEMBLY AND ASSEMBLING METHOD THEREOF, ASSEMBLY TOOL AND BATTERY PACK

CROSS-REFERENCE TO RELATED APPLICATION

This application claims the priority benefit of China application no. 202210191288.X, filed on Feb. 28, 2022. The entirety of the above-mentioned patent application is hereby incorporated by reference herein and made a part of this specification.

BACKGROUND

Technical Field

The present disclosure relates to the technical field of batteries, and in particular, to a busbar assembly and an assembling method thereof, an assembly tool and a battery pack.

Description of Related Art

There are several batteries in a battery pack, and multiple battery units are connected in series and parallel to achieve the voltage and capacity required by the product. When using the battery pack, it is necessary to use a busbar assembly to connect the batteries, so as to derive signals such as voltage from the battery pack.

There is a height difference between a first electrode terminal and a second electrode terminal of the existing battery. When a busbar assembly is adopted to connect the first electrode terminal and the second electrode terminal of the battery in the adjacent battery units, the busbar assembly needs to be provided with multiple structural components in order to realize the connection operation between adjacent battery units.

However, when the existing busbar assemblies are connected to adjacent battery units, the multiple structural components in the busbar assemblies are stacked and arranged in layers and occupy a large space, which makes it difficult to achieve miniaturized design of the battery pack.

SUMMARY

The present disclosure provides a busbar assembly and an assembling method thereof, an assembly tool and a battery pack.

According to a first aspect of the present disclosure, a busbar assembly includes a first busbar, and the first busbar is configured to connect two adjacent battery units. The first busbar includes a first connection part and a second connection part. The first connection part is configured to connect the first electrode terminal of one of the two adjacent battery units. The second connection part is configured to connect the second electrode terminal of the other one of the battery units, and the second connection part and the first connection part are in staggered arrangement to be configured to match a vertical distance between a lead surface of the second electrode terminal and a lead surface of the first electrode terminal located on a same side of the battery units.

According to a second aspect of the present disclosure, a battery pack is provided and includes the abovementioned busbar assembly and battery units. Each of the battery units has the first electrode terminal and the second electrode terminal, and the lead surface of the first electrode terminal and the lead surface of the second electrode terminal are located on the same side and are not coplanar. In the busbar assembly, the first connection part of the first busbar is connected to the lead surface of the first electrode terminal, and the second connection part of the first busbar is connected to the lead surface of the second electrode terminal. The first connection part and the second connection part are in staggered arrangement to adapt to the vertical distance between the lead surface of the first electrode terminal and the lead surface of the second electrode terminal.

According to a third aspect of the present disclosure, a method for assembling a busbar assembly is provided, and the method includes using a first busbar to connect two adjacent battery units. The step of using the first busbar to connect the two adjacent battery units includes the following. Connecting a first connection part of the first busbar to a lead surface of a first electrode terminal of one of the battery units, and connecting a second connection part of the first busbar to a lead surface of a second electrode terminal of the other one of the battery units, such that the first connection part and the second connection part in staggered arrangement match the vertical distance between the lead surface of the second electrode terminal and the lead surface of the first electrode terminal on a same side of the battery units.

According to a fourth aspect of the present disclosure, an assembly tool for a busbar assembly is provided, and the assembly tool includes a bracket and a first pre-pressing assembly and a second pre-pressing assembly disposed on the bracket. The first pre-pressing assembly has a first pre-pressing surface, and the first pre-pressing surface is configured to pre-press the first connection part of the first busbar on a lead surface of the first electrode terminal of one of the adjacent battery units. The second pre-pressing assembly has a second pre-pressing surface, and the second pre-pressing surface is configured for pre-pressing the second connection part of the first busbar on a lead surface of the second electrode terminal of the other one of adjacent battery units. The second pre-pressing surface and the first pre-pressing surface are in staggered arrangement, and a distance between the first pre-pressing surface and the second pre-pressing surface is adapted a distance between the first connection part and the second connection part of the first busbar.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Figure 1:
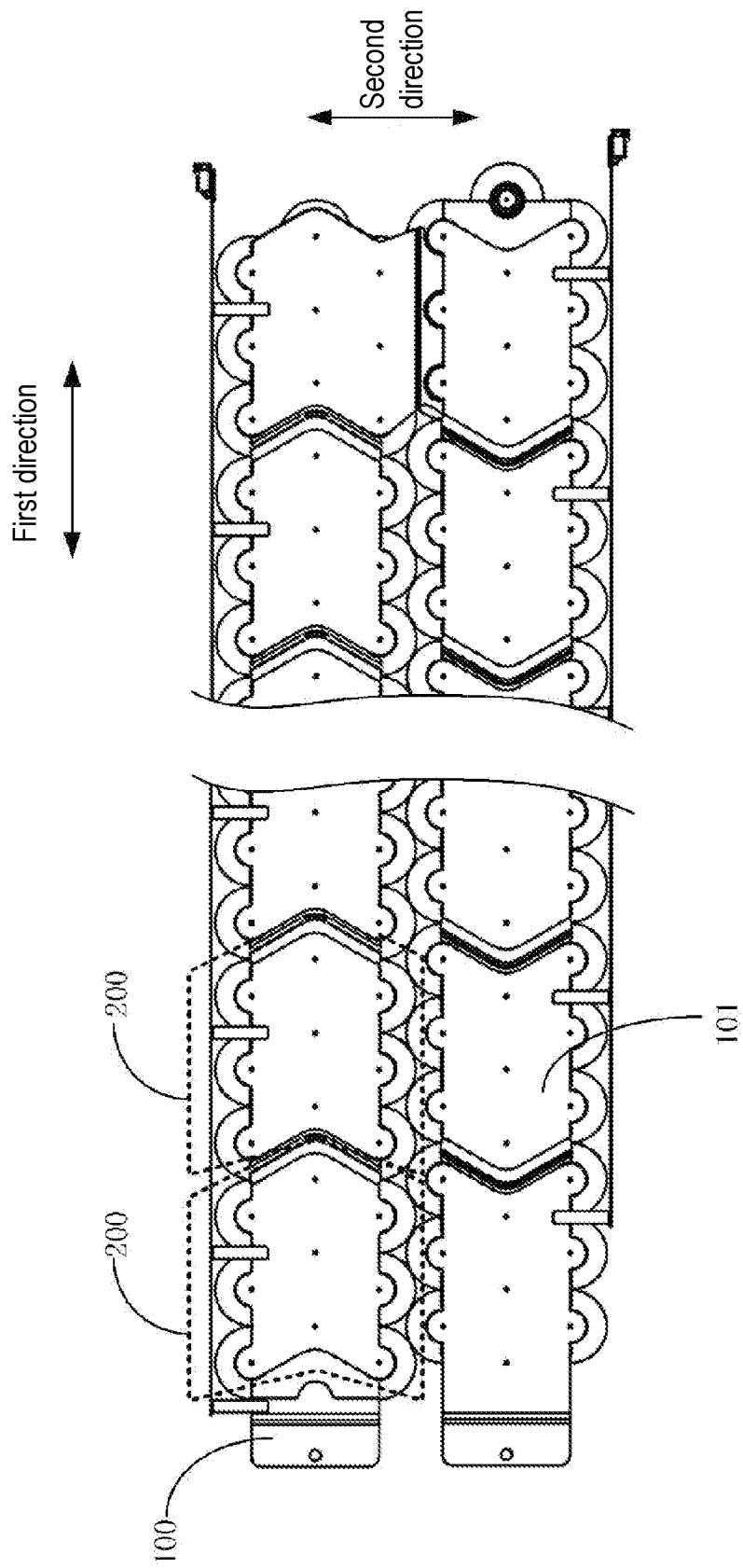
FIG. 1 is a schematic structural view of a battery pack according to an embodiment of the present disclosure.
Figure 2:
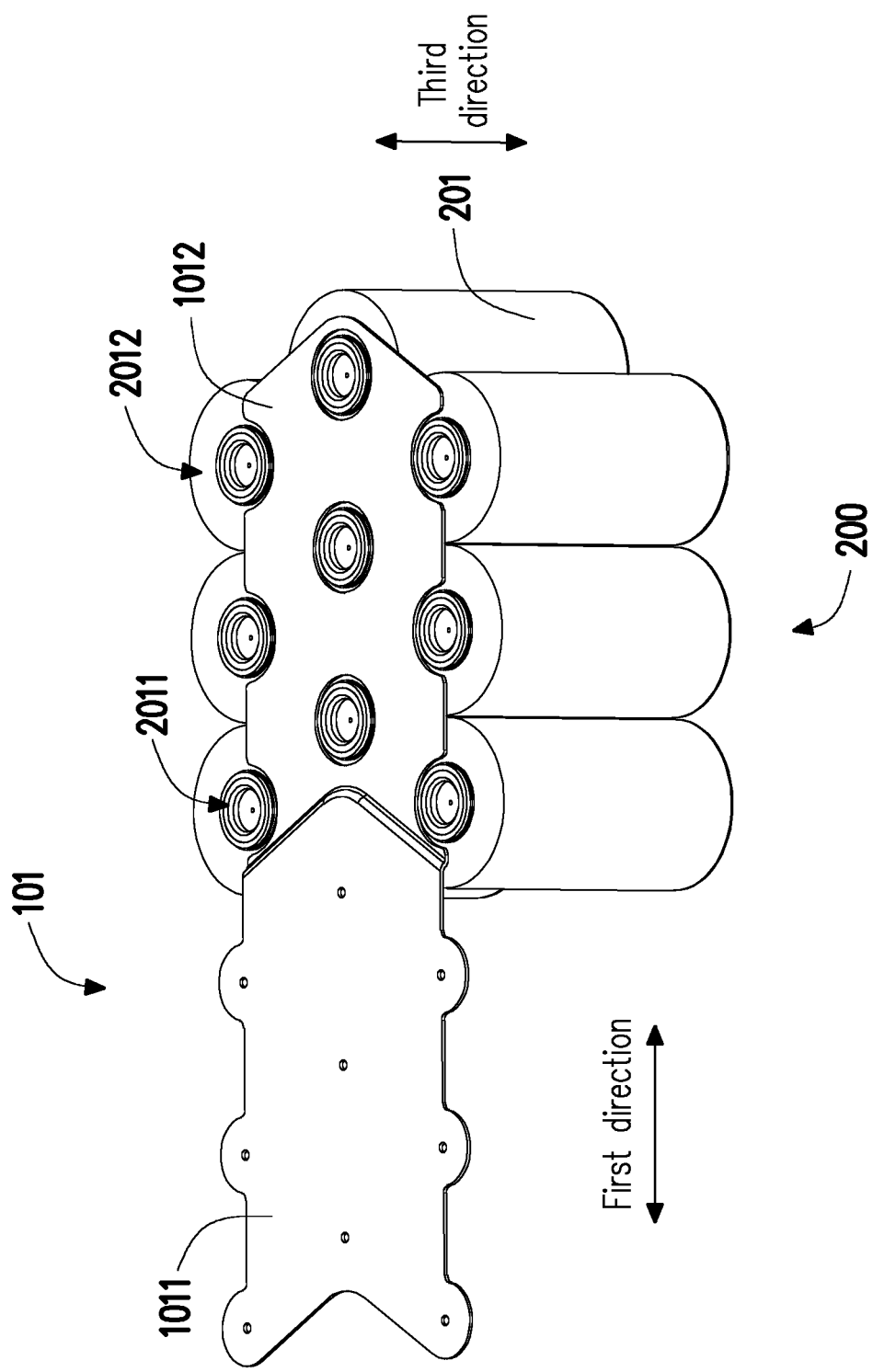
FIG. 2 is a schematic structural view of a current to-be-connected unit in FIG. 1.

FIG. 1 is a schematic structural view of a battery pack according to an embodiment of the present disclosure. FIG. 2 is an enlarged schematic view of a part of the structure in FIG. 1. As the structure shown in FIG. 1 and FIG. 2, the battery pack provided by an embodiment of the present disclosure includes a busbar assembly 100 and battery units 200. Each of the battery units 200 has a first electrode terminal 2011 and a second electrode terminal 2012, and a lead surface of the first electrode terminal 2011 and a lead surface of the second electrode terminal 2012 are located on the same side of the battery units 200 and are not coplanar. In the busbar assembly 100, the first connection part 1011 and the second connection part 1012 of the first busbar 101 are in staggered arrangement. The first connection part 1011 of the first busbar 101 connects the first electrode terminal 2011 of one of the two adjacent battery units 200. The second connection part 1012 of the first busbar 101 connects the second electrode terminal 2012 of the other one of the two adjacent battery units 200.

It should be understood that, the staggered arrangement is not the same as the stacked arrangement, and the "staggered arrangement" means that along a third direction, the first connection part 1011 and the second connection part 1012 are located in two layers, and the two are staggered from each other.

It should be noted that, in the battery pack provided by the embodiment of the present disclosure, the first electrode terminal 2011 and the second electrode terminal 2012 of the battery unit 200 are both located on the same side of the battery unit 200, that is, the first electrode terminal 2011 and the second electrode terminal 2012 are lead from the same side of the battery unit 200. It should be understood that the description "lead from the same side" is interpreted relative to the existing structure in which the first electrode terminal and the second electrode terminal are lead from two opposite sides of the battery unit.

When arranging the busbar assembly 100 and the battery units 200, the busbar assembly 100 provided in the embodiment of the present disclosure is placed on one side of the battery units 200. The first connection part 1011 is adopted to connect the first electrode terminal 2011, and the second connection part 1012 is adopted to connect the second electrode terminal 2012, which is sufficient for facilitating the busbar assembly 100 and the battery unit 200 to perform connection operation. Moreover, compared with the structure in which the battery units are lead from both sides, the battery pack provided by the embodiment of the present disclosure does not need to turn over the battery units 200 to perform the connection operation between the busbar assembly 100 and the first electrode terminal 2011 and the second electrode terminal 2012. As such, the preparation process may be simplified.

Figure 6:
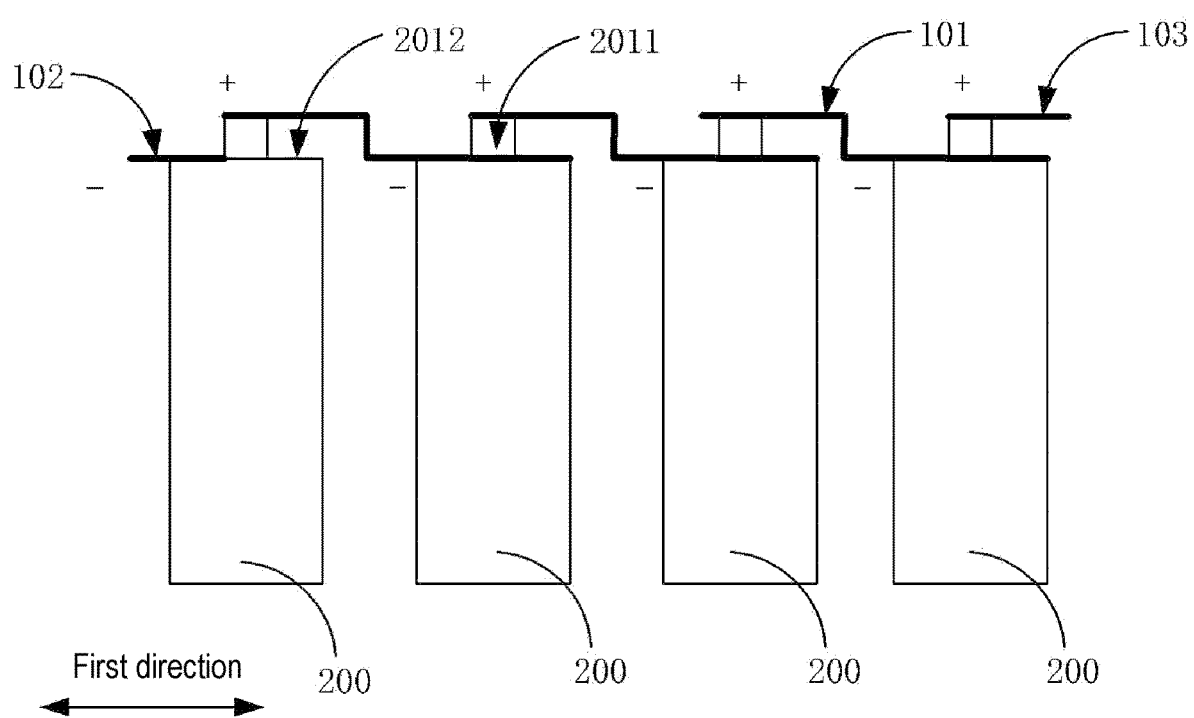
FIG. 6 is a schematic structural view of a battery pack according to an embodiment of the present disclosure.

Exemplarily, in order to illustrate the battery pack provided in the embodiment of the present disclosure more clearly, please continue to refer to the structure shown in FIG. 1. The battery units 200 in the battery pack provided by the embodiment of the present disclosure are illustrated by dashed-line boxes, and a plurality of battery units 200 are arranged in sequence to form an array. Exemplarily, in an embodiment, the plurality of battery units 200 only form an array extending along the first direction, as shown in FIG. 6. It should be understood that, if one end of the array is defined as the "head end", the other corresponding end is the "tail end".

Please continue to refer to the structure shown in FIG. 1. Each battery unit 200 includes a plurality of batteries 201. Exemplarily, as shown in FIG. 2, each battery unit 200 includes nine batteries 201, and every three of the nine batteries 201 extend along the first direction to form a row, and the three rows of batteries 201 formed by the nine batteries 201 are arranged in a staggered arrangement. Certainly, the number and arrangement of the batteries 201 in each battery unit 200 may be set according to requirements, and details are not described herein again. Certainly, it can also be configured that each battery unit 200 contains only one battery 201.

In an embodiment, please continue to refer to the structure shown in FIG. 2. Each battery 201 in the battery unit 200 is a cylindrical battery. Exemplarily, the battery 201 includes a housing and a pole protruding from the housing. The pole serves as the first electrode terminal 2011, and an end surface of the pole protruding from the housing and away from the battery 201 serves as the lead surface of the first electrode terminal 2011. The housing is used as the second electrode terminal 2012, and an end surface of the housing, corresponding to the pole protruding from the housing, is used as the lead surface of the second electrode terminal 2012.

Certainly, the first electrode terminal 2011 and the second electrode terminal 2012 may be configured as a pole structure or other structures simultaneously, as long as there is a height difference between the lead surfaces (i.e., the connection surfaces) of the two along the third direction. It should be understood that, the third direction is parallel to the extending direction of the pole axis and perpendicular to the first direction.

It should be noted that, in each battery 201, the polarities of the first electrode terminal 2011 and the second electrode terminal 2012 are opposite, and the two are insulated from each other. Specifically, when the first electrode terminal 2011 is a positive polarity terminal, the second electrode terminal 2012 is a negative polarity terminal; otherwise, when the first electrode terminal 2011 is a negative polarity terminal, the second electrode terminal 2012 is a positive polarity terminal.

It should be noted that, the structures of the batteries 201 between adjacent battery units 200 are the same or different. In a specific embodiment, the adjacent battery units 200 have the same structure, that is, the arrangement of the batteries 201 in the former battery unit 200 and the latter battery unit 200 is the same, and the structure of each battery 201 is the same. In the two battery units 200, the first electrode terminals 2011 of the batteries 201 are of the same polarity, and the second electrode terminals 2012 are of the same polarity. In another specific embodiment, the arrangement of the batteries 201 in adjacent battery units 200 is the same, but the structures of the batteries 201 are different. In two adjacent battery units 200, the first electrode terminal 2011 of the battery 201 in the former battery unit 200 and the second electrode terminal 2012 of the battery 201 in the latter battery unit 200 have the same polarity, and the second electrode terminal 2012 of the battery 201 in the former battery unit 200 has the same polarity as the first electrode terminal 2011 of the battery 201 in the latter battery unit 200. Exemplarily, the pole of the battery 201 in the former battery unit 200 is a positive polarity terminal, and the housing of the battery 201 is a negative polarity terminal. The pole of the battery 201 in the latter battery unit 200 is a negative polarity terminal, and the housing of the battery 201 is a positive polarity terminal. It should be understood that, this structural form may be realized by adjusting the material of the housing of the battery 201 or even by setting other auxiliary parts.

Exemplarily, take "the structures of adjacent battery units 200 are the same, and the first electrode terminal 2011 (pole) is a positive polarity terminal, and the second electrode terminal 2012 (the housing of the battery 201) is a negative polarity terminal" as an example in the following description.

It should be noted that the busbar assembly 100 in the battery pack provided by the embodiment of the present disclosure is the busbar assembly 100 in any of the following technical solutions.

Referring to the structures shown in FIG. 1 to FIG. 6, the busbar assembly 100 provided in the embodiment of the present disclosure includes a first busbar 101, which is used to connect two adjacent battery units 200. The first busbar 101 includes the first connection part 1011 and the second connection part 1012. The first connection part 1011 is configured to connect the first electrode terminal 2011 of one of the two adjacent battery units 200. The second connection part 1012 is configured to connect the second electrode terminal 2012 of the other one of the two adjacent battery units 200. The second connection part 1012 and the first connection part 1011 are in staggered arrangement for matching the vertical distance between the lead surface of the second electrode terminal 2012 and the lead surface of the first electrode terminal 2011 on the same side of the battery units 200.

It should be noted that, the lead surface of the second electrode terminal 2012 and the lead surface of the first electrode terminal 2011 on the same side of the battery unit 200 may be completely parallel to each other. In this case, the vertical distance between the two lead surfaces is a distance difference between the two surfaces along the third direction. Certainly, the lead surface of the second electrode terminal 2012 and the lead surface of the first electrode terminal 2011 on the same side of the battery unit 200 may also be approximately parallel to each other, that is, the two lead surfaces are not completely parallel due to the manufacturing process or assembly process condition.

It should be noted that, in the busbar assembly 100 provided in the embodiment of the present disclosure, the first busbar 101 connects two adjacent battery units 200 to realize series-parallel operation between the adjacent battery units 200. Specifically, the first connection part 1011 of the first busbar 101 connects the first electrode terminal 2011 of one of the two adjacent battery units 200, and the second connection part 1012 of the first busbar 101 connects the second electrode terminal 2012 of the other one of the two adjacent battery units 200.

It should be noted that, the first connection part 1011 and the second connection part 1012 of the first busbar 101 are in staggered arrangement, and this structure may match the vertical direction between the first electrode terminal 2011 and the second electrode terminal 2012 between the adjacent battery units 200 along the third direction. In the meantime, the staggered structure arrangement may reduce the space occupied by the busbar assembly 100, which helps to improve the space utilization rate in the battery pack.

As shown in FIG. 6, taking the adjacent battery units 200 in the first direction as an example, the first connection part 1011 of the first busbar 101 connects the first electrode terminal 2011 (pole) of each battery 201 in the former battery unit 200. The second connection part 1012 of the first busbar 101 connects the second electrode terminal 2012 (the housing of the battery 201) of each battery 201 in the latter battery unit 200. Specifically, the positive polarity structure of the former battery unit 200 is connected to the negative polarity structure of the latter battery unit 200 through the first busbar 101, and the adjacent battery units 200 are connected in series through the first busbar 101. It should be understood that, under the circumstances, each of the batteries 201 in each of the battery units 200 is connected in parallel.

It should be noted that, by using the busbar assembly 100 provided by the embodiment of the present disclosure, the series-parallel connection between the plurality of batteries 201 in the battery pack may be realized, so that the battery pack provided by the embodiment of the present disclosure may reach the voltage and capacity required by the product.

Figure 3:
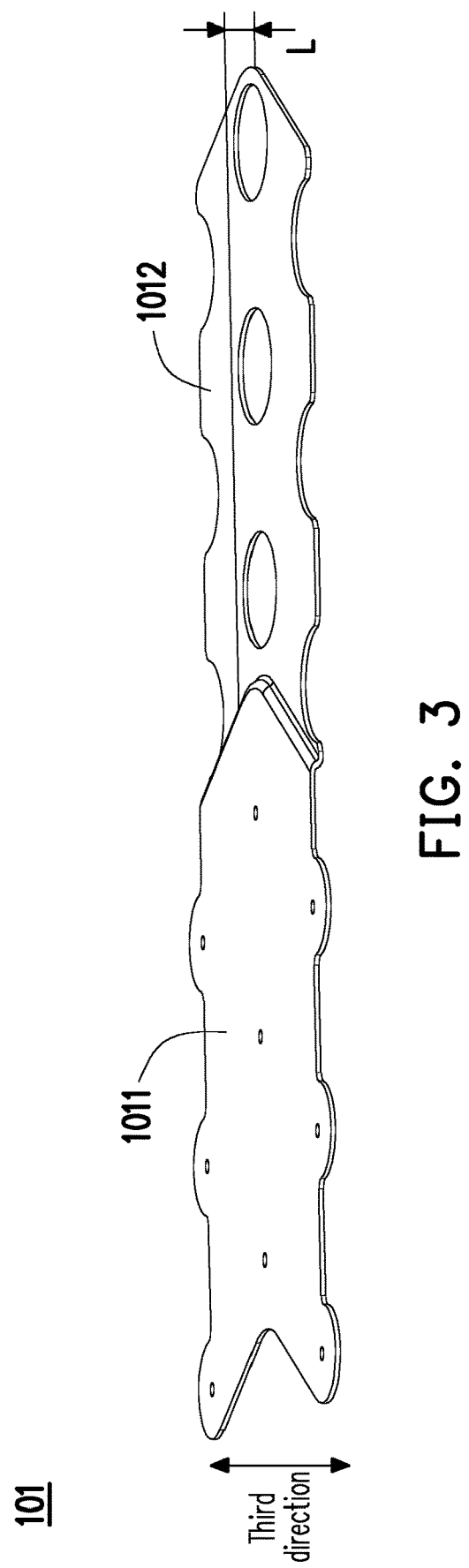
FIG. 3 is a schematic structural view of a first busbar in a busbar assembly according to an embodiment of the present disclosure.

In an embodiment, please refer to the structure shown in FIG. 3, the configuration may be set as follows. Along the third direction, there is a difference L between a surface on one side of the first connection part 1011 in the first busbar 101 away from the battery 201 and a surface on one side of the second connection part 1012 away from the battery 201. The dimension of this L ranges from 1.5 mm to 5 mm. Exemplarily, L may be set to be 1.5 mm, 1.6 mm, 1.7 mm, 1.8 mm, 1.9 mm, 2 mm, 2.1 mm, 2.2 mm, 2.3 mm, 2.4 mm, 2.5 mm, 2.75 mm, 3 mm, 3.25 mm, 3.5 mm, 3.75 mm, 4 mm, 4.25 mm, 4.5 mm, 4.75 mm, or 5 mm.

It should be noted that, when the value of L is too small, the first busbar 101 may not effectively compensate for the vertical distance between the lead surface of the first electrode terminal 2011 of the battery 201 and the lead surface of the second electrode terminal 2012, which makes it more difficult to connect the busbar assembly 100 to the battery 201. When the value of L is too large, after the second connection part 1012 of the first busbar 101 abuts against the end surface of the housing of the battery 201, there will be a gap between the first connection part 1011 and the pole surface in the third direction, which increases the difficulty of connecting the two.

Therefore, setting the dimension of L within the range of 1.5 mm to 5 mm may allow the height difference between the first connection part 1011 and the second connection part 1012 to match the height difference between the lead surfaces of the first electrode terminal 2011 and the second electrode terminal 2012 of the battery 201 in the third direction, so that the first busbar 101 may effectively connect the two adjacent battery units 200.

It should be noted that the L value may be the same as or different from the height difference between the lead surface of the first electrode terminal 2011 and the lead surface of the second electrode terminal 2012 of the battery 201 along the third direction. Specifically, in an embodiment, the L value may be set to be the same as the height difference between the two lead surfaces in the third direction, so as to better match the vertical distance between the two lead surfaces. Certainly, the L value may also be set to be less than the height difference between the two lead surfaces in the third direction.

Figure 4:
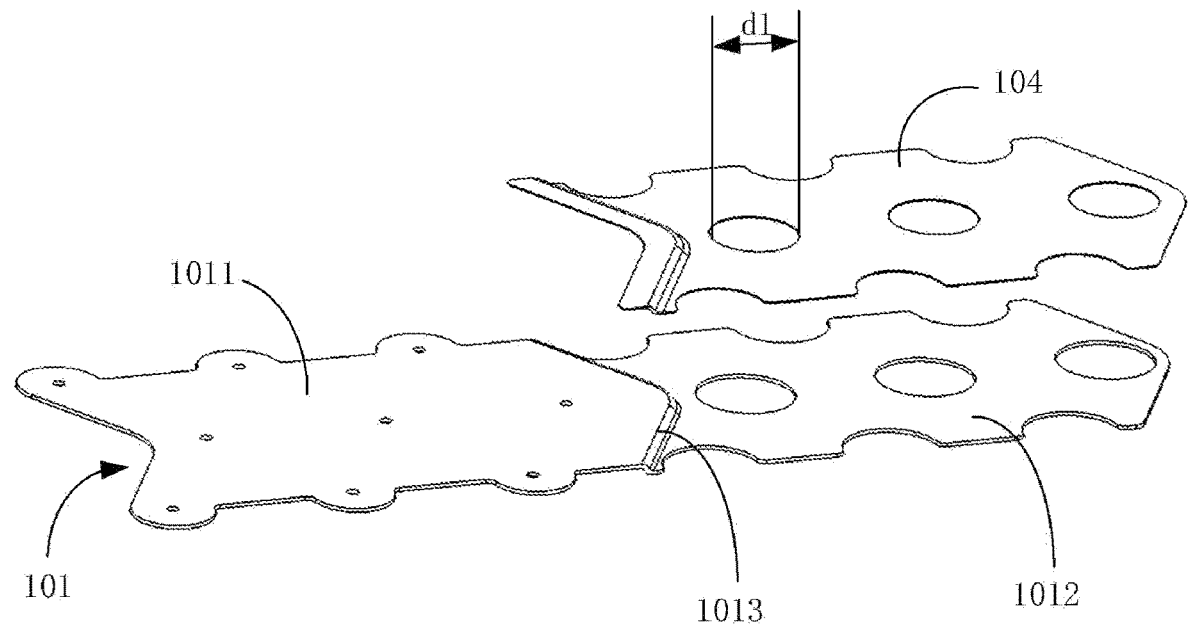
FIG. 4 is another schematic structural view of a first busbar in a busbar assembly according to an embodiment of the present disclosure.

In an embodiment, please refer to the structure shown in FIG. 4, the first busbar 101 further includes a bent part 1013, and the bent part 1013 is configured to form a distance difference between the first connection part 1011 and the second connection part 1012 in staggered arrangement.

It should be noted that the bent part 1013 may fix the first connection part 1011 and the second connection part 1012 to ensure the stability of the first connection part 1011 and the second connection part 1012 during assembly. In the meantime, the bent part 1013 may realize the effective connection between the first connection part 1011 and the second connection part 1012 in the same first busbar 101.

When specifically setting the structure of the bent art 1013, the structure of the bent part 1013 may be realized in various ways:

In a specific embodiment, the bent part 1013 may be a detachable structure. Specifically, the first busbar 101 may be spliced, for example, a detachable bent part 1013 is provided between the first connection part 1011 and the second connection part 1012.

In another specific embodiment, the bent part 1013 has an integrated structure with the first connection part 1011 and the second connection part 1012. It should be noted that the integrated structure may simplify the configuration and preparation processes and improve the efficiency. In the meantime, the integrated structure may increase the connection area corresponding to the first connection part 1011 and the second connection part 1012 in the first busbar 101, thereby increasing the overcurrent area and ensuring the overcurrent capability.

In an embodiment, the bent part 1013 is provided with a buffer structure for enhancing the structural strength of the bent part 1013. It should be noted that the buffer structure may prolong the service life of the first busbar 101 and prevent the first busbar 101 from being torn from the bent part 1013.

In a specific embodiment, the bent part 1013 extends to form a buffer structure, and the buffer structure protrudes from the first connection part 1011 to the second connection part 1012. Certainly, the buffer structure may also be a separate buffer layer, etc., which will not be repeated here. It should be noted that, the buffer structure is formed by changing the extending direction of the bent part 1013. Exemplarily, the buffer structure is a V-shaped buffer as shown in FIG. 4, and the V-shaped buffer protrudes from the first connection part 1011 to the second connection part 1012. It should be noted that, taking the buffer structure as a V-shaped buffer as an example, on one hand, the extending direction of the bent part 1013 forms an included angle with the second direction for buffering, and on the other hand, the buffer structure may match the arrangement of the plurality of batteries 201 in the battery unit 200.

Figure 11:
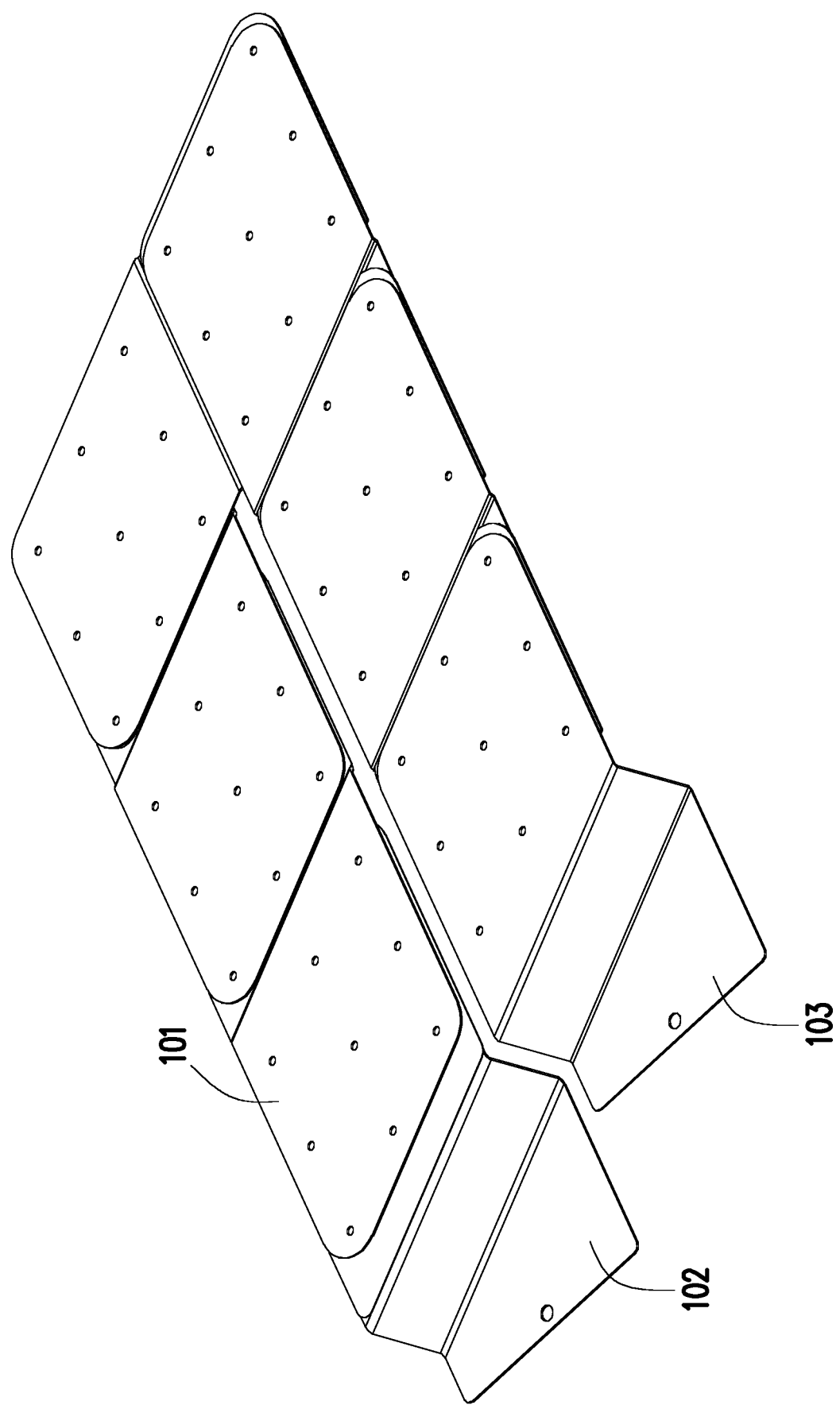
FIG. 11 is another schematic structural view of a busbar assembly according to an embodiment of the present disclosure.

It should be understood that, in addition to the V-shape as shown in FIG. 4, the buffer structure may also be an arc-shaped buffer or a structure such as an oblique buffer as shown in FIG. 11, which can be set as required, and will not be repeated here.

In an embodiment, one side of the first connection part 1011 facing away from the buffer structure is provided with a notch structure, and the shape of the notch structure is adapted to the shape of the buffer structure. It should be noted that, when a plurality of first busbars 101 are used together, the notch structure of each first busbar 101 is used to cooperate with the buffer structure of another first busbar 101 to achieve insulation between the two first busbars 101.

When using the busbar assembly 100 provided by the embodiment of the present disclosure, the number of the first busbars 101 may be set according to the number of the battery units 200, so as to realize the connection operation of the plurality of battery units 200 located between the arrays. In an embodiment, the number of the first busbars 101 is multiple, the multiple first busbars 101 are arranged in sequence, and the adjacent first busbars 101 are insulated from each other. It should be understood that a plurality of first busbars 101 refers to including at least two first busbars 101.

Specifically, please continue to refer to the structures shown in FIG. 1 and FIG. 6, the first connection part 1011 of the latter first busbar 101 is stacked with the second connection part 1012 of the former first busbar 101, and the first connection part 1011 of the latter first busbar 101 is arranged in the same layer as the first connection part 1011 of the former first busbar 101. It should be understood that the "same layer arrangement" of the first connection part 1011 of the latter first busbar 101 and the first connection part 1011 of the former first busbar 101 may be the same layer or approximately the same layer, which will not be repeated here.

It should be noted that, this arrangement allows the presence of only a stacked two-layer structure when the plurality of first busbars 101 are used together along the third direction. In this manner, it is possible to reduce the space occupied by the busbar assembly 100 along the third direction provided in the embodiment of the present disclosure, so that the space utilization rate in the battery pack may be improved.

In an embodiment, the array formed by the plurality of battery units 200 may be deformed. In other words, the array formed by the plurality of battery units 200 may not all be arranged in the first direction. Please continue to refer to the structure shown in FIG. 1, exemplarily, the plurality of battery units 200 form two sub-arrays extending along the first direction, and the two sub-arrays are arranged along the second direction. It should be noted that the second direction is perpendicular to the first direction and is perpendicular to the third direction. It should be understood that the two sub-arrays are not limited to be arranged in parallel, and an included angle may also be formed as required, which will not be repeated here.

Figure 9:
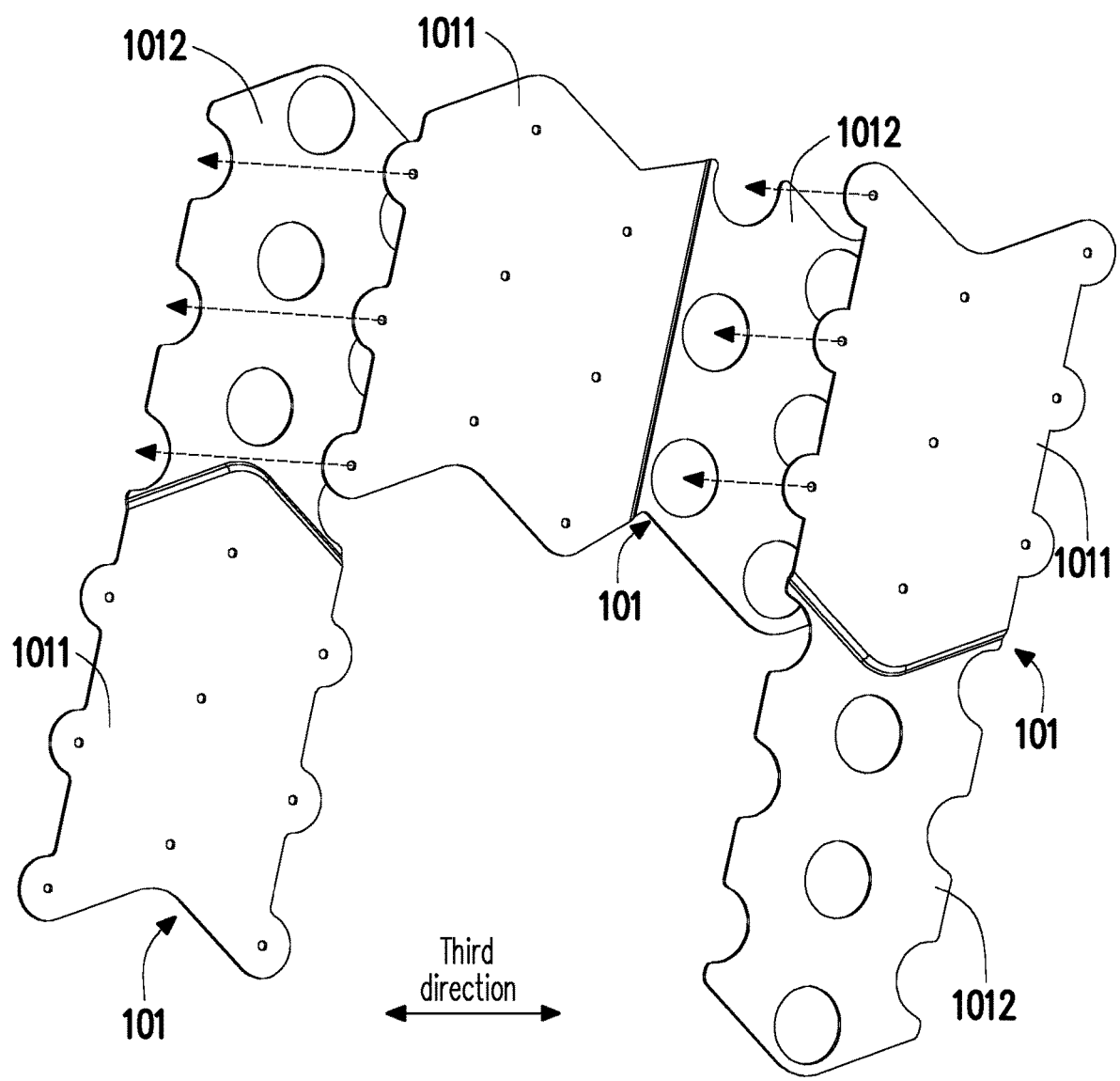
FIG. 9 is another schematic partial explosion view of a busbar assembly according to an embodiment of the present disclosure.

It should be noted that when an array formed by the plurality of battery units 200 includes two sub-arrays that are not collinear, a special-shaped first busbar 101 needs to be used for connection. The first busbar 101 of this special shape serves as a reversing busbar. It should be understood that the reversing busbar allows the busbar assembly 100 provided in the embodiment of the present disclosure to adapt to various arrangement of the plurality of battery units 200, so as to match the space in the box or meet the design requirements. Exemplarily, the reversing busbar corresponding to the array shape in FIG. 1 is shown in FIG. 9, and the structure shown in FIG. 10 is formed after the special-shaped first busbar 101 is assembled with the adjacent first busbar 101.

In an embodiment, please refer to the structure shown in FIG. 4, the first busbar 101 further includes an insulating structure 104, and at least part of the insulating structure 104 is located between the second connection part 1012 of the former first busbar 101 and the first connection part 1011 of the latter first busbar 101. It should be understood that the insulating structure 104 may be provided separately, or may be provided on one side of the first connection part 1011 of the second connection part 1012 facing another first busbar 101, or may be provided on one side of the first connection part 1011 facing the second connection part 1012 of another first busbar 101. Exemplarily, the insulating structure 104 may be formed of an insulating coating, an insulating tape, or an insulating film. It should be noted that, the insulating structure 104 may form effective insulation between the two first busbars 101 to prevent short circuit and ensure the safety performance of the battery pack.

Figure 10:
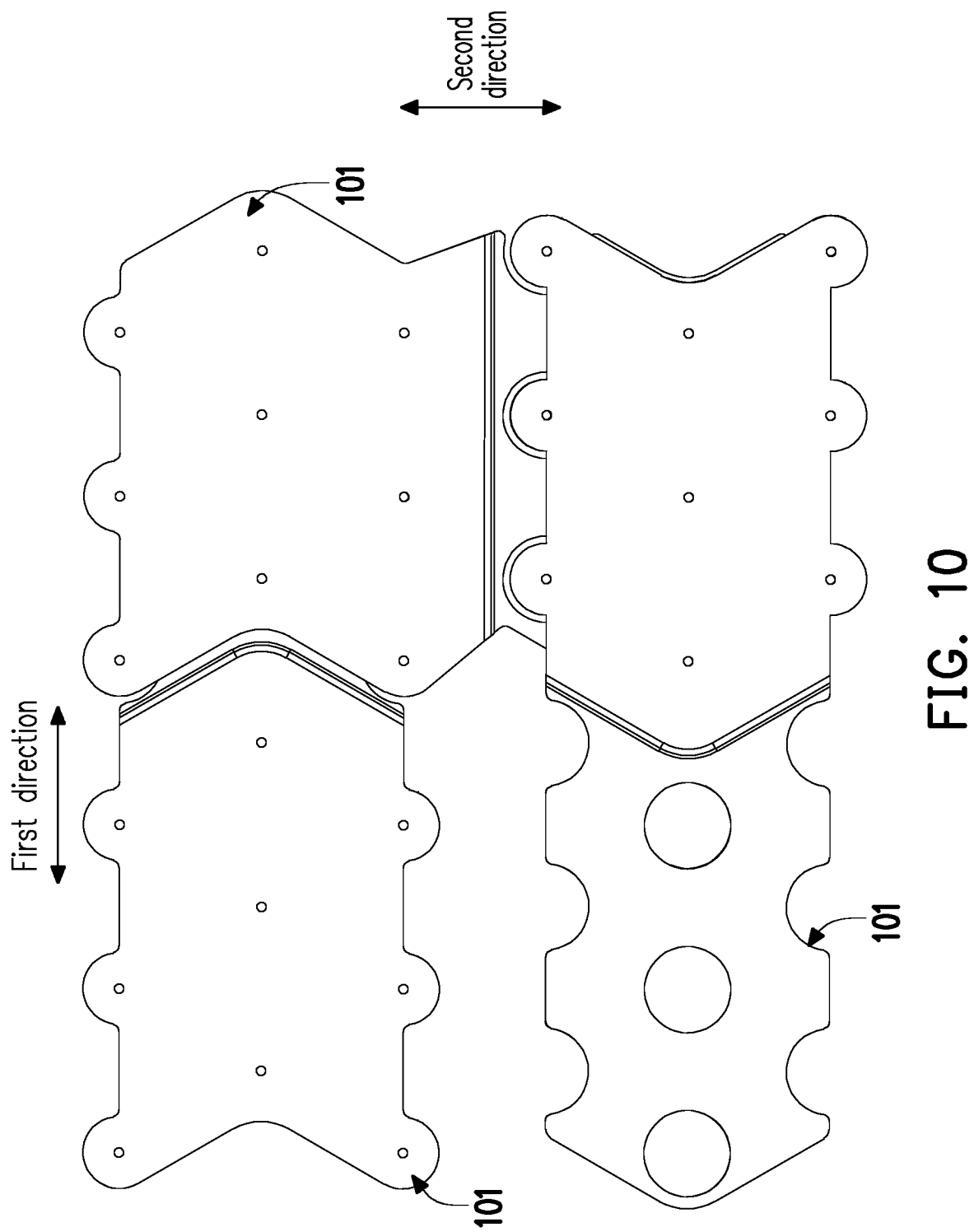
FIG. 10 is a schematic structural view of the structure in FIG. 9 after combination.

In an embodiment, please refer to the structure shown in FIG. 10, the insulating structure 104 is further disposed between the buffer structure of the former first busbar 101 and the notch structure of the latter first busbar 101. It should be noted that, when the insulating structure 104 is further disposed between the buffer structure of the former first busbar 101 and the notch structure of the latter first busbar 101, it is possible to prevent the two first busbars 101 from contacting at the buffer structure and the notch structure. The arrangement of such structure may further improve the insulation effect between the two first busbars 101.

Figure 7:
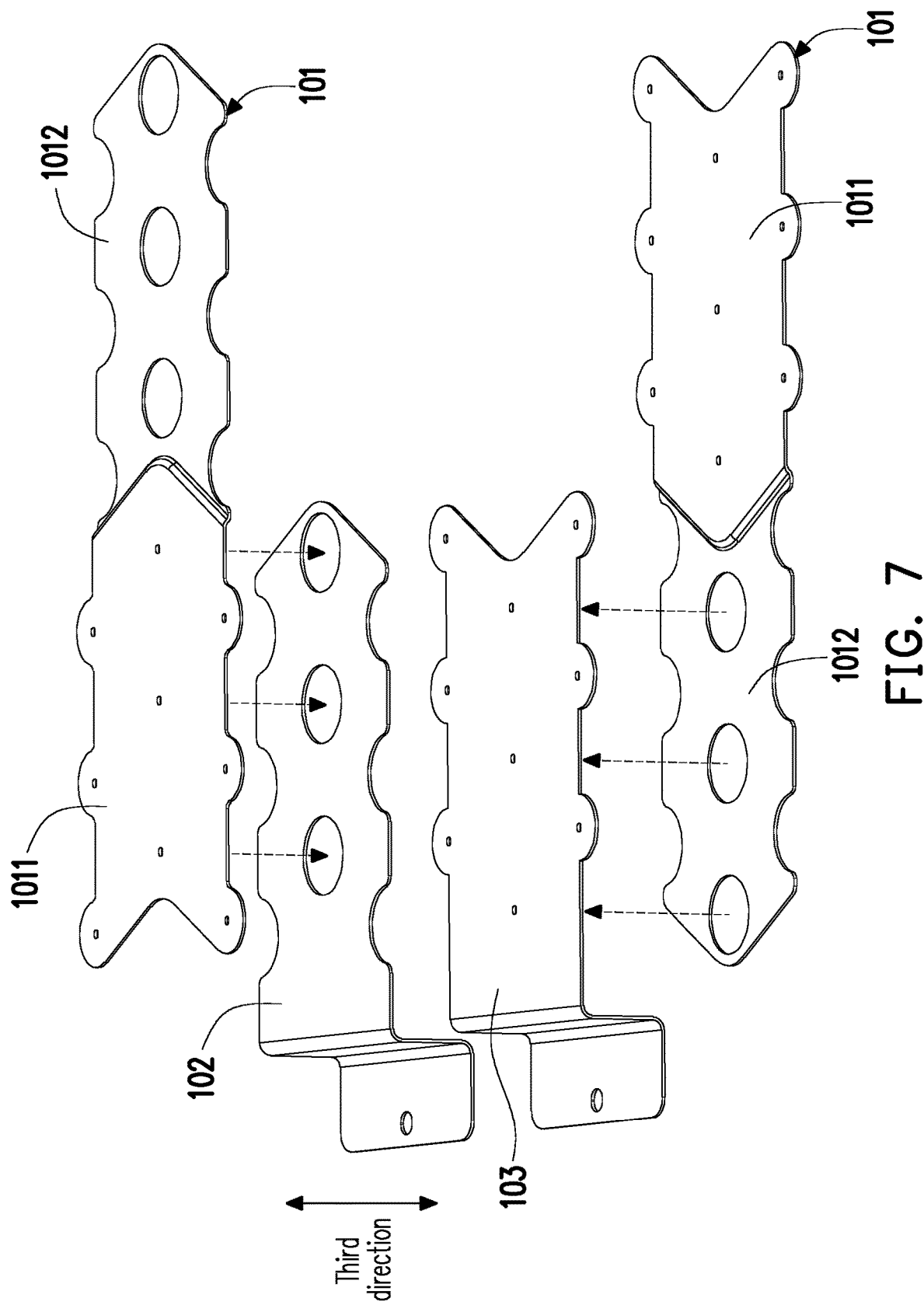
FIG. 7 is a schematic partial explosion view of a busbar assembly according to an embodiment of the present disclosure.
Figure 8:
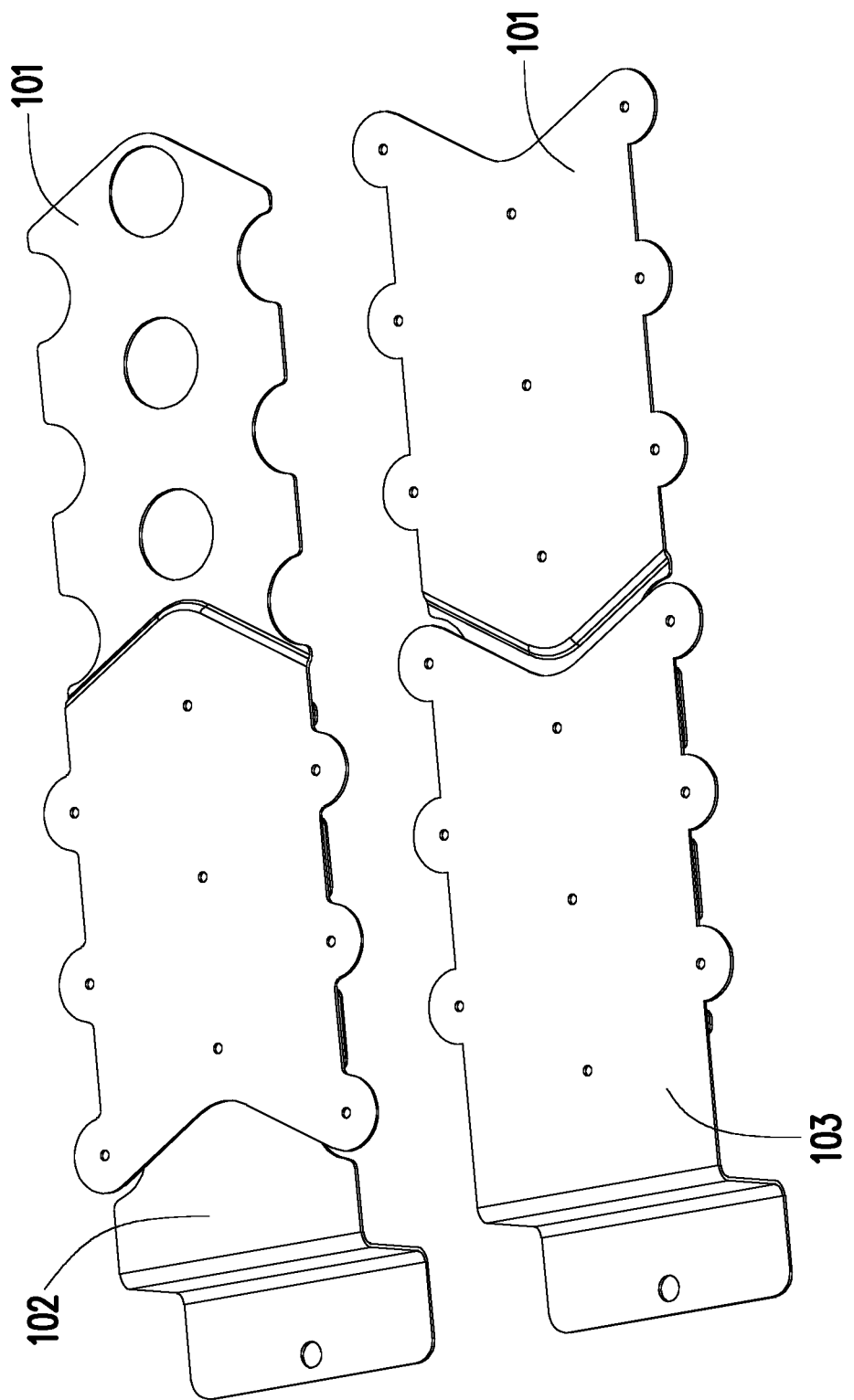
FIG. 8 is a schematic structural view of the structure in FIG. 7 after combination.

In an embodiment, please continue to refer to the structure shown in FIG. 2 and FIG. 7, in the first busbar 101, the first connection part 1011 is provided with a contoured structure, the contoured structure is adapted to the shape of the first electrode terminal 2011, and the first connection part 1011 abuts against the lead surface of the first electrode terminal 2011 through the contoured structure. The second connection part 1012 is provided with a through hole, the first electrode terminal 2011 passes through the through hole, and the second connection part 1012 abuts against the lead surface of the second electrode terminal 2012.

Taking the first busbar 101 as an example, the first connection part 1011 of the first busbar 101 forms a circular-like structure (i.e., a contoured structure) corresponding to the shape of the pole at the edge, so as to facilitate the connection between the first connection part 1011 and the pole. It should be noted that the contoured structure may reduce the weight of the busbar assembly 100 and increase the internal heat dissipation area of the battery 201 on the basis of ensuring a sufficient connection area between the first busbar 101 and the electrode terminals of the battery 201.

It should be understood that the through hole on the second connection part 1012 may be a complete through hole structure, or may be a through hole structure lacking part of the structure as shown in FIG. 2. Specifically, taking the first busbar 101 as an example, the second connection part 1012 of the first busbar 101 forms a circular hollow structure (i.e., a complete through hole) at the portion corresponding to the pole in the middle, so that the pole of the latter battery unit 200 may pass through. In the meantime, semi-circular escape openings (through holes lacking part of the structure) are formed at the edges on both sides of the second connection part 1012, so that the poles may pass through.

In an embodiment, the diameter of the through hole provided in the second connection part 1012 is larger than the diameter of the pole. It should be noted that when the structure of the through hole is set, the diameter of the through hole is expected to be larger than the diameter of the pole, so as to insulate the second connection part 1012 from the pole and avoid contact between the two.

Please continue to refer to the structure shown in FIG. 4, the insulating structure 104 is also formed with through holes so as to allow the poles to pass through. As shown in FIG. 4, the diameter d1 of the through hole of the insulating structure 104 may be the same as the diameter of the through hole on the second connection part 1012.

In an embodiment, the diameter d1 of the through hole of the insulating structure 104 may be smaller than the diameter of the through hole of the second connection part 1012. Under the circumstances, the diameter d1 of the through hole of the insulating structure 104 is expected to be larger than the diameter of the pole.

Figure 5:
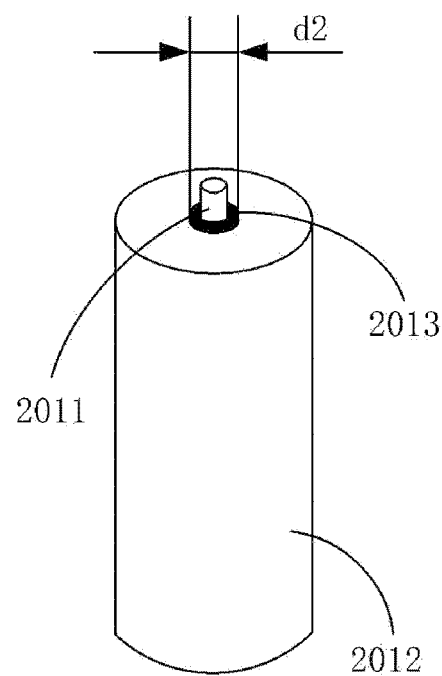
FIG. 5 is a schematic structural view of a battery in a battery pack according to an embodiment of the present disclosure.

Specifically, as shown in FIG. 5, taking a battery 201 as an example, the pole serving as the first electrode terminal 2011 protrudes from one side of a housing serving as the second electrode terminal 2012, and the housing is provided with a through hole structure for the pole to pass through. It should be noted that, in order to avoid contact between the pole and the housing and short circuit, an insulating sleeve 2013 is provided at the through hole structure to insulate the pole from the side wall of the through hole structure. It should be understood that the diameter d1 of the through hole of the insulating structure 104 may be set smaller than the diameter d2 of the insulating sleeve 2013, that is, the insulating structure 104 partially covers the end surface on one side of the insulating sleeve 2013 facing away from the lead pole of the housing. It should be noted that, this structural arrangement may further improve the insulating effect of the insulating structure 104 with respect to the two first busbars 101.

In an embodiment, as shown in FIG. 1 and FIG. 6, the busbar assembly 100 provided in this embodiment of the present disclosure further includes a second busbar 102 and a third busbar 103. The second busbar 102 is configured to connect the same battery unit 200 with the adjacent first busbar 101. The first busbar 101 is configured to connect the first electrode terminal 2011 of the battery unit 200. The second busbar 102 is configured to connect the second electrode terminal 2012 of the battery unit 200, and the second busbar 102 includes a first output part. The first output part is disposed on one side of the first connection part 1011 of the first busbar 101 facing the second connection part 1012, and the first output part is disposed opposite to the first connection part 1011. The third busbar 103 is configured to connect the same battery unit 200 with the adjacent first busbar 101. The first busbar 101 is configured to connect the second electrode terminal 2012 of the battery unit 200. The third busbar 103 is configured to connect the first electrode terminal 2011 of the battery unit 200, and the third busbar 103 includes a second output part. The second output part is disposed on one side of the second connection part 1012 of the adjacent first busbar 101 facing the first connection part 1011, and the second output part is disposed opposite to the second connection part 1012. It should be noted that, in this arrangement, when the first busbar 101, the second busbar 102 and the third busbar 103 are used together, there is only a stacked two-layer structure along the third direction, so it is possible to reduce the space occupied by the busbar assembly 100 provided in the embodiment of the present disclosure along the third direction, so that space utilization rate in the battery pack may be improved.

Exemplarily, in the adjacent first busbar 101 and the second busbar 102, the first connection part 1011 of the first busbar 101 and the second busbar 102 are configured to connect the first battery unit 200. In the adjacent first busbar 101 and the third busbar 103, it is exemplified that the second connection part 1012 of the first busbar 101 and the third busbar 103 are connected to the last battery unit 200. There may be multiple battery units 200 provided between the first battery unit 200 and the last battery unit 200, and the multiple battery units 200 are connected through multiple first busbars 101. Certainly, it is also possible to configure the busbar assembly 100 to include only the second busbar 102 or the third busbar 103 according to requirements, which will not be repeated here.

In an embodiment, referring to the through hole and the contoured structure at the first busbar 101, the configuration may be set as follows. The second busbar 102 is provided with a through hole so that the poles may pass through, and the third busbar 103 is provided with a contoured structure so as to facilitate the connection with the poles, and details are not repeated here.

Similarly, an insulating structure 104 may also be provided between the second busbar 102 and the first busbar 101, and between the third busbar 103 and the first busbar 101, the details will not be repeated here.

Please continue to refer to the structure shown in FIG. 7, the edges of the second busbar 102 and the third busbar 103 in the busbar assembly 100 provided by the embodiment of the present disclosure are bent. Specifically, by bending the shapes of the edges of the second busbar 102 and the third busbar 103, they may better adapt to the structure in the box, facilitate fixing, or may match the arrangement shape of the batteries 201 in the battery unit 200.

Figure 12:
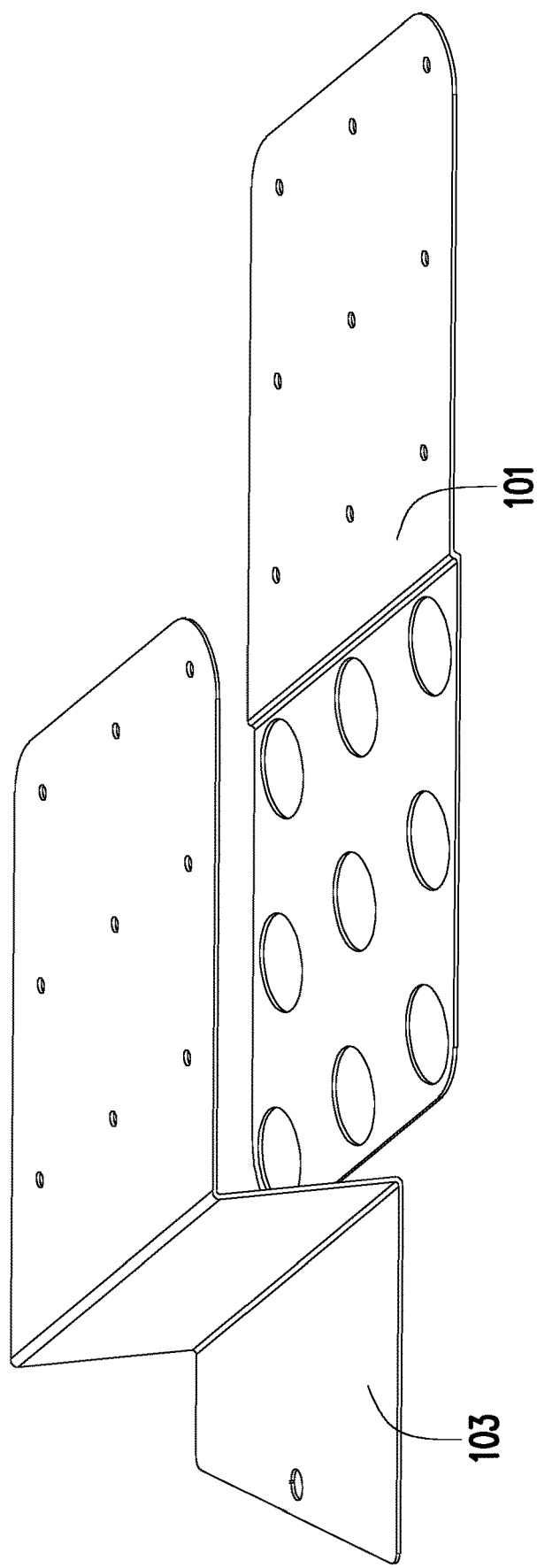
FIG. 12 is a schematic partial explosion view of a busbar assembly according to an embodiment of the present disclosure.

It should be noted that the shapes of the second busbar 102 and the third busbar 103 are not limited to the structures shown in FIG. 1 to FIG. 8, and may be set according to requirements. Exemplarily, the structure of the busbar assembly 100 may also be shown in FIG. 11 and FIG. 12. It should be noted that the busbar assembly 100 shown in FIG. 11 and FIG. 12 has a simple structure, and in the meantime, the connection area between the busbar assembly 100 and the battery unit 200 may be increased, and the overcurrent capability may be improved.

Referring to FIG. 1 to FIG. 4, an embodiment of the present disclosure further provides a method for assembling a busbar assembly 100, and the method includes using a first busbar 101 to connect two adjacent battery units 200. The step of connecting two adjacent battery units 200 by using the first busbar 101 includes as follows. The first connection part 1011 of the first busbar 101 connects the lead surface of the first electrode terminal 2011 of one battery unit 200, and the second connection part 1012 of the first busbar 101 connects the lead surface of the second electrode terminal 2012 of the other battery unit 200, such that the first connection part 1011 and the second connection part 1012 in staggered arrangement match the vertical distance between the lead surface of the second electrode terminal 2012 and the lead surface of the first electrode terminal 2011 on the same side of the battery unit 200.

It should be noted that, the assembling method of the busbar assembly 100 provided by the embodiment of present disclosure adopts the first busbar 101 to connect two adjacent battery units 200. Specifically, the first connection part 1011 of the first busbar 101 connects the first electrode terminal 2011 of one of the two adjacent battery units 200, and the second connection part 1012 of the first busbar 101 connects the second electrode terminal 2012 of the other of the two adjacent battery units 200.

It should be noted that the first connection part 1011 and the second connection part 1012 of the first busbar 101 are in staggered arrangement, and the structure may match the vertical distance between the lead surface of the second electrode terminal 2012 and the lead surface of the first electrode terminal 2011 on the same side of the battery unit 200. In the meantime, the staggered structure arrangement of the first busbar 101 may reduce the space occupied by the busbar assembly 100, which helps to improve the space utilization rate in the battery pack.

Figure 13:
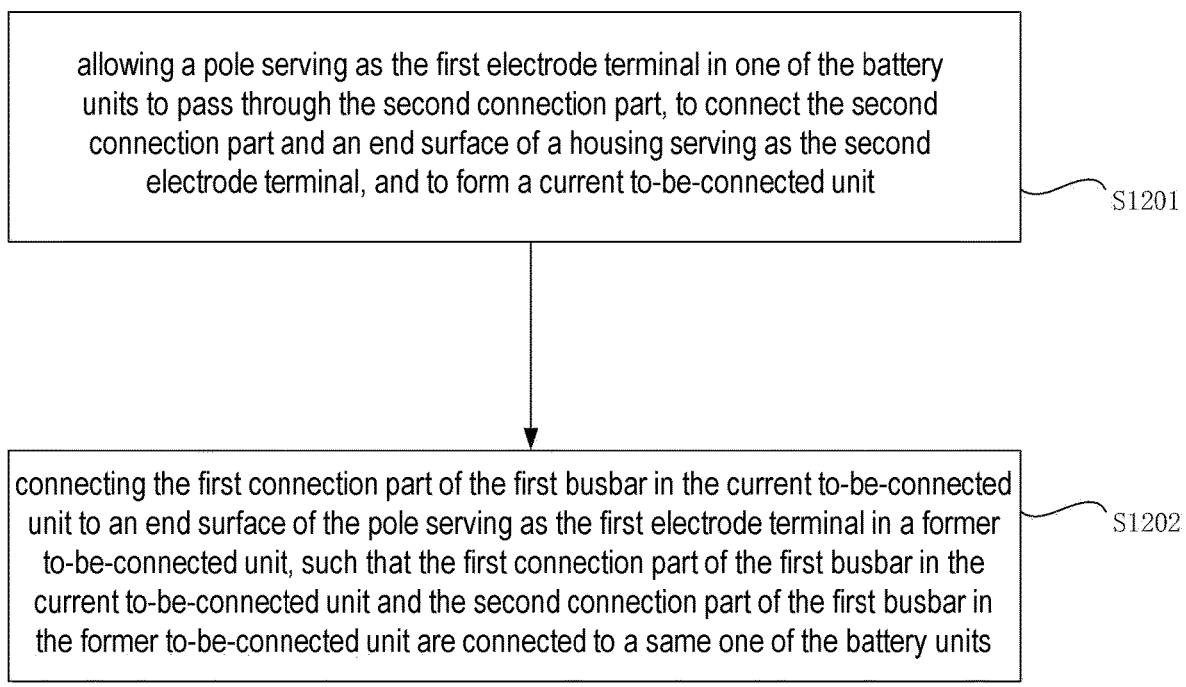
FIG. 13 is a schematic flowchart of a method for assembling a busbar assembly according to an embodiment of the present disclosure.

In an embodiment, referring to the structure shown in FIG. 13, when the battery unit 200 includes at least one battery 201 and the battery 201 is a cylindrical battery, the method of using the first busbar 101 to connect the two adjacent battery units 200 further includes:

Step S1201: Allowing a pole serving as the first electrode terminal 2011 in a battery unit 200 to pass through the second connection part 1012 of the first busbar 101, to connect the second connection part 1012 and an end surface of the housing serving as the second electrode terminal 2012, and to form a current to-be-connected unit.

Step S1202: Connecting the first connection part 1011 of the first busbar 101 in the current to-be-connected unit to the end surface of the pole serving as the first electrode terminal 2011 in the former to-be-connected unit, such that the first connection part 1011 of the first busbar 101 in the current to-be-connected unit and the second connection part 1012 of the first busbar 101 in the former to-be-connected unit are connected to the same battery unit 200.

It should be noted that, due to the height difference between the first connection part 1011 and the second connection part 1012 along the third direction, in order to simplify the assembly operation and improve the stability of the assembled structure, the second connection part 1012 of the first busbar 101 may be connected to the second electrode terminal 2012 of a set of battery units 200 first to form a current to-be-connected unit. Exemplarily, as shown in FIG. 2, the pole of the battery unit 200 passes through the through hole of the second connection part 1012, and the second connection part 1012 abuts against the end surface of the housing of the battery 201. Thereafter, a plurality of to-be-connected units as shown in FIG. 2 are assembled, so that the first connection part 1011 of one to-be-connected unit is connected to the first electrode terminal 2011 of another to-be-connected unit. Exemplarily, the first connection part 1011 abuts against the end surface of the pole of another battery unit 200. Certainly, after the to-be-connected unit as shown in FIG. 2 is formed, it may be assembled with the former to-be-connected unit first, and then a new to-be-connected unit may be formed. It should be noted that the "former to-be-connected unit" may be the structure shown in FIG. 2, or may be multiple structures that have been assembled as shown in FIG. 2.

In an embodiment, before the first connection part 1011 of the first busbar 101 in the current to-be-connected unit is connected to the end surface of the pole serving as the first electrode terminal 2011 in the former to-be-connected unit, the method further includes as follows. An insulating structure 104 is formed between the second connection part 1012 in the former to-be-connected unit and the first connection part 1011 in the current to-be-connected unit. It should be noted that the insulating structure 104 may be provided separately, and may also be provided on one side of the second connection part 1012 facing the first connection part 1011 of another first busbar 101, and may also be provided on one side of the first connection part 1011 facing the second connection part 1012 of another first busbar 101. Exemplarily, the insulating structure 104 is formed by coating an insulating layer, or by attaching insulating materials such as insulating tape and insulating film.

Certainly, the insulating structure 104 may also be formed before each structure is assembled. In an embodiment, before using the first busbar 101 to connect the two adjacent battery units 200, the method further includes:

Forming the insulating structure 104 on one side, facing the battery unit 200, of the first connection part 1011 of the first busbar 101; or Forming the insulating structure 104 on one side, facing away from the battery unit 200, of the second connection part 1012 of the first busbar 101.

It should be noted that under the condition where the insulating structure 104 is formed before assembly, subsequent assembly operations may be performed conveniently and assembly efficiency may be improved.

In an embodiment, when the busbar assembly 100 provided in the embodiment of the present disclosure further includes a second busbar 102, before using the first busbar 101 to connect the two adjacent battery units 200, the assembling method further includes:

Abutting the first output part of the second busbar 102 against the end surface of the housing in one battery unit 200, such that the pole in the battery unit 200 penetrates the through hole on the first output part to form the former to-be-connected unit.

Connecting the first busbar 101 to another battery unit 200 to form the current to-be-connected unit.

Abutting the first connection part 1011 in the current to-be-connected unit against the end surface of the pole in the former to-be-connected unit, such that the first connection part 1011 of the first busbar 101 and the first output part of the second busbar 102 are connected to the same battery unit 200.

In an embodiment, when the busbar assembly 100 provided in the embodiment of the present disclosure further includes a third busbar 103, after using the first busbar 101 to connect the two adjacent battery units 200, the assembling method further includes:

Abutting the second output part of the third busbar 103 against the end surface of the pole in the to-be-connected unit formed by the first busbar 101 and one battery unit 200, such that the second output part of the third busbar 103 and the second connection part 1012 of the first busbar 101 are connected to the same battery unit 200.

It should be noted that, the assembling method of the busbar assembly 100 provided in the embodiment of the present disclosure may involve the configuration of the plurality of first busbars 101 and the configuration of the second busbar 102 and the third busbar 103. By using the assembling method of the busbar assembly 100 provided in the present disclosure, the plurality of busbars may be stacked in staggered arrangement, so as to reduce the space occupied by the busbar assembly 100 and improve the space utilization rate in the battery pack.

Specifically, by using the assembling method of the busbar assembly 100 provided in the present disclosure, the second connection part 1012 of the plurality of first busbars 101 and the first output part of the second busbar 102 may be located at almost the same height, and the first connection part 1011 of the plurality of first busbars 101 and the second output part of the third busbar 103 may be located at almost the same height, which may improve the configuration evenness of the busbar assembly 100, facilitate the connection of the busbar assembly 100 to the external structure, and even facilitate the arrangement of other structural components in the box.

A specific assembling method is now provided. Exemplarily, the first output part of the second busbar 102 is welded to the housing of the battery 201 of the first set of battery unit 200. The second connection part 1012 of a first one of the first busbars 101 is welded to the housing of the battery 201 of the second set of battery unit 200 first, and the first connection part 1011 of the first one of the first busbars 101 is welded to the pole of the first set of battery unit 200. The second connection part 1012 of the second one of the first busbars 101 is welded to the housing of the battery 201 of the latter set of the battery unit 200, and the first connection part 1011 of the second one of the first busbars 101 is welded to the pole of the battery 201 of the former set of battery unit 200, and so forth. After the last first busbar 101 is configured, the third busbar 103 is welded to the pole of the last set of battery unit 200 to complete the assembly operation of the busbar assembly 100. It should be noted that the above structure is only exemplarily described by taking the assembly process of the first busbar 101, the second busbar 102 and the third busbar 103 as an example. Certainly, the assembling method provided in the embodiment of the present disclosure further includes the formation and preparation of the insulating structure 104, which are not shown here.

Figure 14:
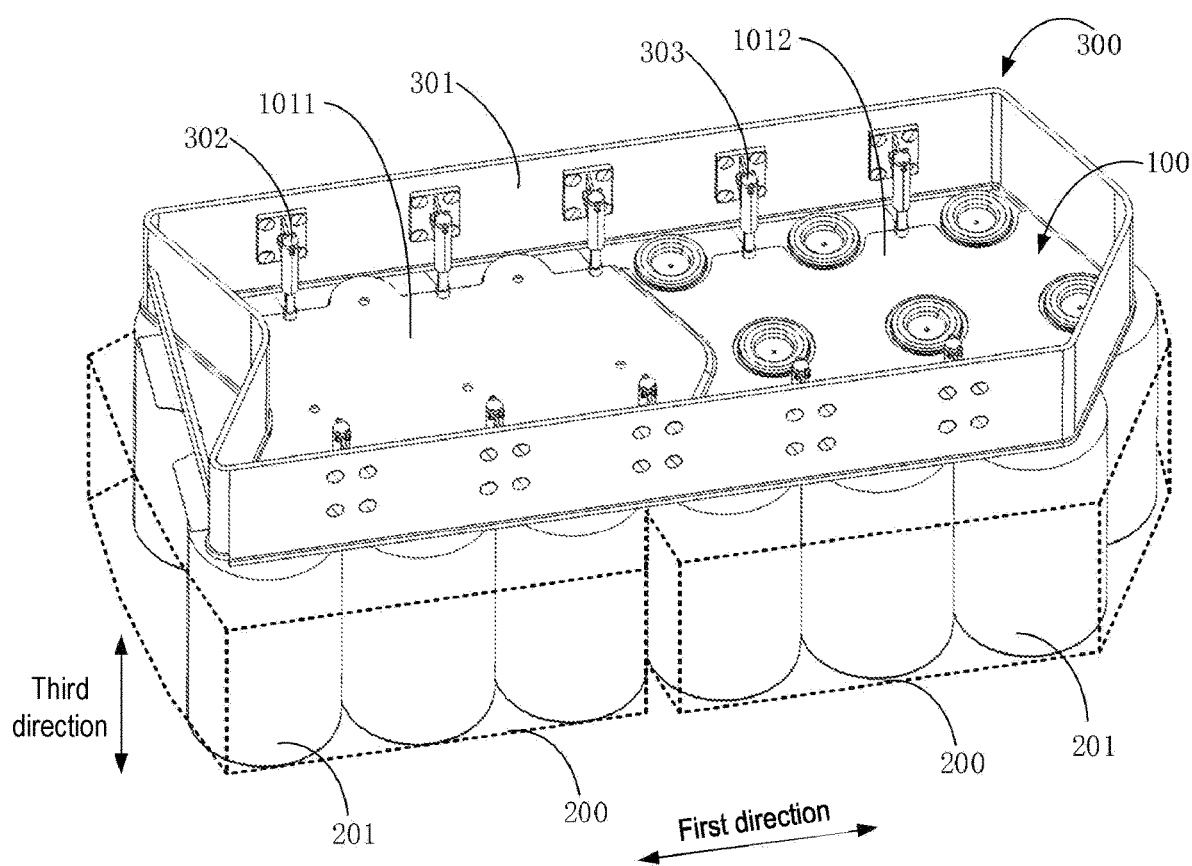
FIG. 14 is a schematic structural view of an assembly tool for a busbar assembly according to an embodiment of the present disclosure.

An embodiment of the present disclosure further provides an assembly tool 300 for the busbar assembly 100. FIG. 14 is a schematic structural view of the assembly tool 300 for the busbar assembly 100 provided by the embodiment of the present disclosure. As shown in FIG. 14, the assembly tool 300 includes a bracket 301 and a first pre-pressing assembly 302 and a second pre-pressing assembly 303 that are provided on the bracket 301. The first pre-pressing assembly 302 has a first pre-pressing surface, and the first pre-pressing surface is configured to pre-press the first connection part 1011 of the first busbar 101 on the lead surface of the first electrode terminal 2011 of one of the adjacent battery units 200. The second pre-pressing assembly 303 has a second pre-pressing surface, and the second pre-pressing surface is configured to pre-press the second connection part 1012 of the first busbar 101 on the lead surface of the second electrode terminal 2012 of the other one of the adjacent battery units 200. The second pre-pressing surface and the first pre-pressing surface are in staggered arrangement, and a distance between the first pre-pressing surface and the second pre-pressing surface is adapted to a distance between the first connection part 1011 and the second connection part 1012 of the first busbar 101.

It should be noted that, in the assembly tool 300 for the busbar assembly 100 provided by the embodiment of the present disclosure, the bracket 301 is provided with the first pre-pressing assembly 302 and the second pre-pressing assembly 303. When applying the assembly tool 300 for the busbar assembly 100 provided by the embodiment of the present disclosure, the first pre-pressing surface of the first pre-pressing assembly 302 pre-presses the first connection part 1011 of the first busbar 101 on the lead surface of the first electrode terminal 2011 of one of the adjacent battery units 200, and the second pre-pressing surface of the second pre-pressing assembly 303 pre-presses the second connection part 1012 of the first busbar 101 on the lead surface of the second electrode terminal 2012 of the other one of the adjacent battery units 200.

It should be noted that the first pre-pressing surface and the second pre-pressing surface are in staggered arrangement, and the distance between the first pre-pressing surface and the second pre-pressing surface may match the distance between the first connection part 1011 and the second connection part 1012 in the first busbar 101, so that the first busbar 101 may effectively connect the two adjacent battery units 200.

In an embodiment, the bracket 301 includes an annular frame having an accommodating cavity for accommodating the first busbar 101, and the annular frame is adapted to the shape of the first busbar 101. Exemplarily, as shown in FIG. 14, the shape of the annular frame is similar to that of the first busbar 101, and the size of the annular frame is larger than that of the first busbar 101, so as to frame the first busbar 101 in the accommodating cavity formed by the annular frame, thus preventing the interference between the annular frame and the first busbar 101 from affecting the stability and alignment accuracy of the connection between the first busbar 101 and the battery unit 200.

Figure 15:
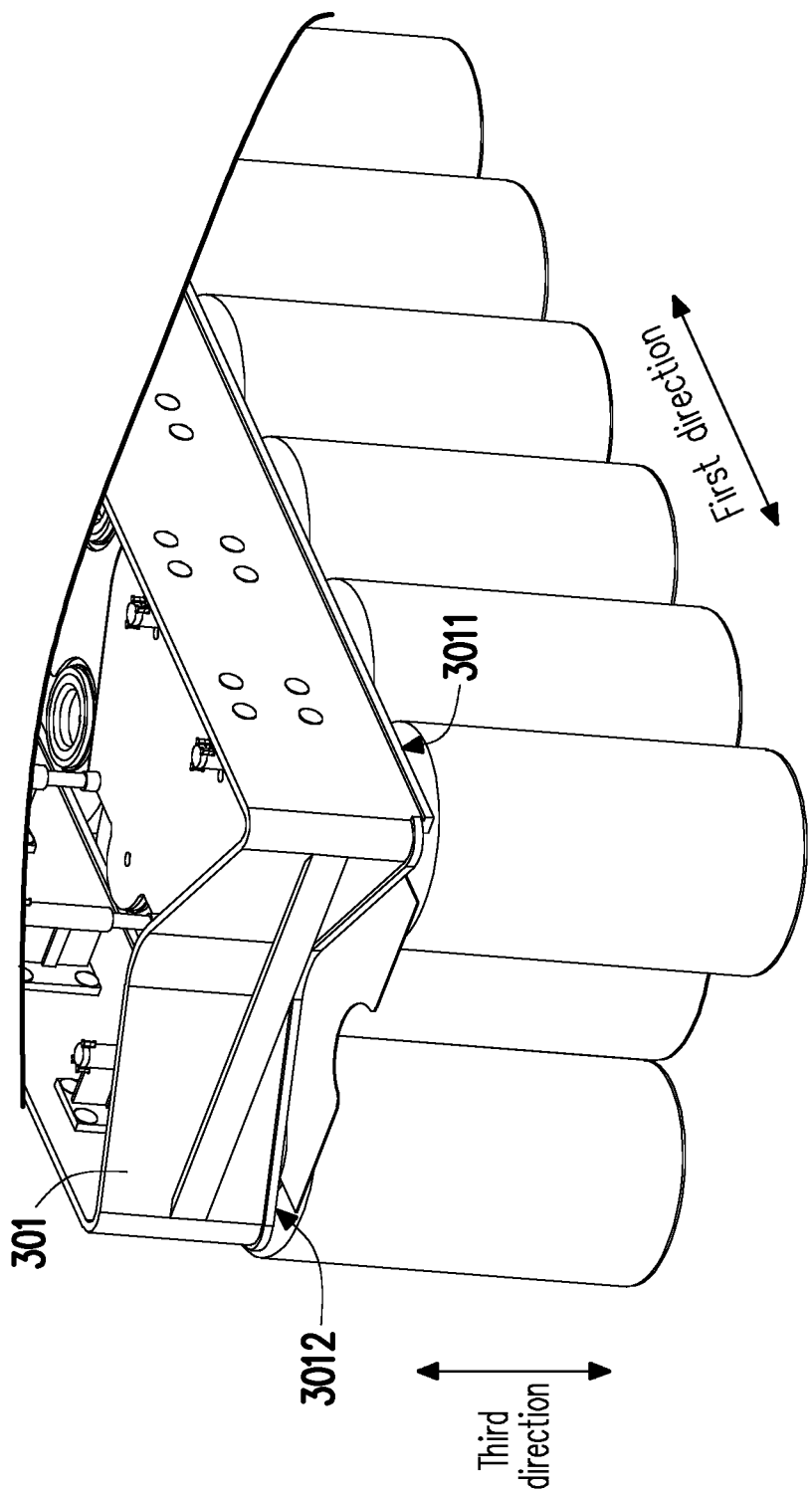
FIG. 15 is another schematic structural view of an assembly tooling for a busbar assembly according to an embodiment of the present disclosure.

In an embodiment, please continue to refer to the structure shown in FIG. 15, the assembly tool 300 is configured to assemble the battery unit 200 formed by the cylindrical battery and the busbar assembly 100. The annular frame has a notch. The notch is configured to match the height difference between the end surface of the housing serving as one lead surface in the battery unit 200 and the end surface of the pole serving as another lead surface.

It should be noted that, since there is a height difference between the end surface of the pole and the end surface of the housing along the third direction, there is a height difference between the first connection part 1011 and the second connection part 1012 along the third direction, so as to achieve the effective connection on the battery 201. Based on the above, in order to match the height difference between the end surface of the pole and the end surface of the housing, the assembly tool 300 for the busbar assembly 100 provided in the embodiment of the present disclosure correspondingly sets the first pre-pressing surface of the first pre-pressing assembly 302 and the second pre-pressing surface of the second pre-pressing assembly 303 in staggered layers. In an embodiment, the first pre-pressing surface may be located on one side of the second pre-pressing surface facing away from the battery, and the height difference between the two along the third direction ranges from 1.5 mm to 5 mm. Specifically, the height difference may be set to 2 mm.

When applying the assembly tool 300 provided by the embodiment of the present disclosure, please refer to the structure shown in FIG. 15. In an embodiment, the first surface 3011 of the annular frame may be set to abut against the end surface of the housing of the battery 201, and the second surface 3012 at the notch abuts against the first connection part 1011, so as to perform auxiliary fixing of the annular frame. In another embodiment, the first surface 3011 of the annular frame may be set to abut against the end surface of the housing of the battery 201, and there is a gap between the second surface 3012 at the notch and the first connection part 1011 to prevent the first connection part 1011 of the first busbar 101 from being deviated under the action of the first surface 3011, thereby avoiding the connection effect from being affected. It should be understood that since the second surface 3012 accounts for most of the area of the annular frame, the stability of the annular frame may be ensured. Certainly, when using the assembly tool 300 for the busbar assembly 100 provided by the embodiment of the present disclosure, the shape of the annular frame and the shape of the notch may also be changed as required, the details will not be repeated here.

In an embodiment, a buffer structure is provided on one side of the annular frame facing the battery unit 200. Exemplarily, the buffer structure may be a buffer rubber pad. It should be noted that a buffer pad may be provided on the entirety of one side of the annular frame, and the buffer pad may also be set partially to ensure a soft contact between the annular frame and the end surface of the housing of the battery 201, thus preventing the annular frame from accidentally touching the battery 201 or the first busbar 101 and causing damage to the device.

In an embodiment, at least one of the first pre-pressing assembly 302 and the second pre-pressing assembly 303 includes a sleeve 3021, a guide pole 3022, and an elastic pressure head. The sleeve 3021 is fixed relative to the bracket 301, and one end of the sleeve 3021 has an opening. The guide pole 3022 at least partially passes through the sleeve 3021. The guide pole 3022 has a pressing position, and when the guide pole 3022 is at the pressing position, one end of the guide pole 3022 protrudes out of the sleeve 3021 from the opening by a predetermined length. The elastic pressure head is arranged at one end of the guide pole 3022 protruding from the sleeve 3021 to press the first busbar 101.

Figure 16:
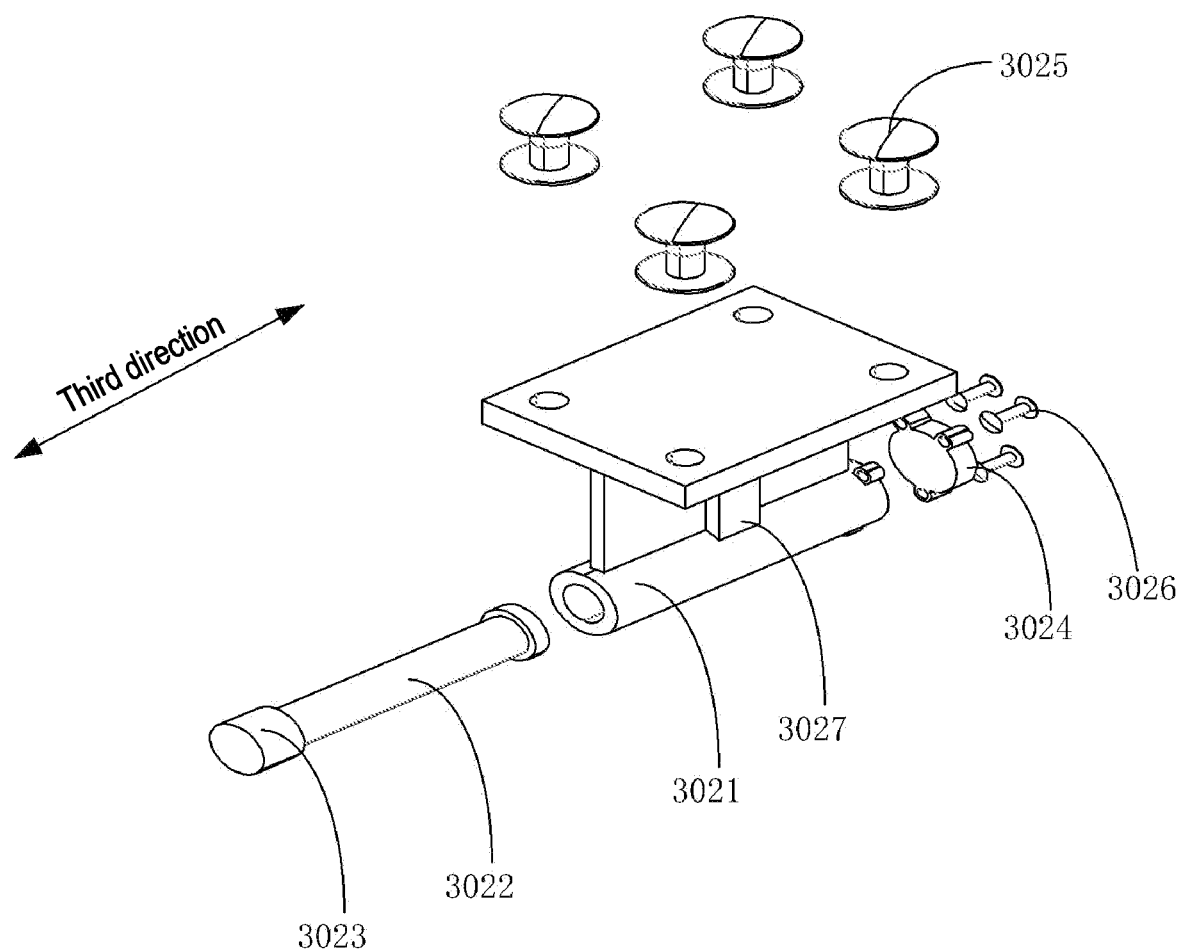
FIG. 16 is a schematic explosion structural view of a first pre-pressing assembly in FIG. 14.

Exemplarily, as shown in FIG. 14 and FIG. 15, both the first pre-pressing assembly 302 and the second pre-pressing assembly 303 are formed by using the above structures. Please refer to the structure shown in FIG. 16, taking the first pre-pressing assembly 302 as an example. When applying the first pre-pressing assembly 302 provided by the embodiment of the present disclosure, the sleeve 3021 is provided in the annular frame, and one end of the guide pole 3022 protrudes out of the sleeve 3021 by a predetermined length, so that the elastic pressure head at the protruding end of the guide pole 3022 may press the first connection part 1011 of the first busbar 101 against the lead surface of the first electrode terminal 2011 of the battery unit 200. It should be understood that the "predetermined length" may be adjusted according to the setting height of the sleeve 3021 relative to the annular frame in the third direction, and details are not repeated here. It should be noted that the elastic pressure head may prevent the first busbar 101 from being scratched when the first pre-pressing assembly 302 performs action on the first busbar 101, thereby preventing damage to the first busbar 101 and improving the stability of the battery pack.

It should be noted that, since there is a height difference between the first connection part 1011 and the second connection part 1012 of the first busbar 101 along the third direction, in a specific embodiment, the configuration may be set as follows: the guide poles 3022 in the first pre-pressing assembly 302 and the second pre-pressing assembly 303 protrude out of the sleeve 3021 by different predetermined lengths, and a length difference between the two is adapted to a difference L between the first connection part 1011 and the second connection part 1012. In another specific embodiment, the configuration may be set as follows: the guide poles 3022 in the first pre-pressing assembly 302 and the second pre-pressing assembly 303 protrude out of the sleeve 3021 by the same predetermined length, the height of the sleeve 3021 in the first pre-pressing assembly 302 and the second pre-pressing assembly 303 along the third direction is adjusted to be adapted to the difference L between the first connection part 1011 and the second connection part 1012.

It should be noted that the sleeve 3021 and the annular frame are detachably connected to facilitate subsequent configuration and removal operations and reduce the difficulty of operation. The sleeve 3021 is connected to the annular frame by rivets 3025. Exemplarily, please continue to refer to the structure shown in FIG. 16, the sleeve 3021 has a fixing part, and the fixing part is detachably connected to the annular frame by rivets 3025, and in order to reinforce the connection strength, the fixing part is provided with a reinforcing rib 3027.

Figure 17:
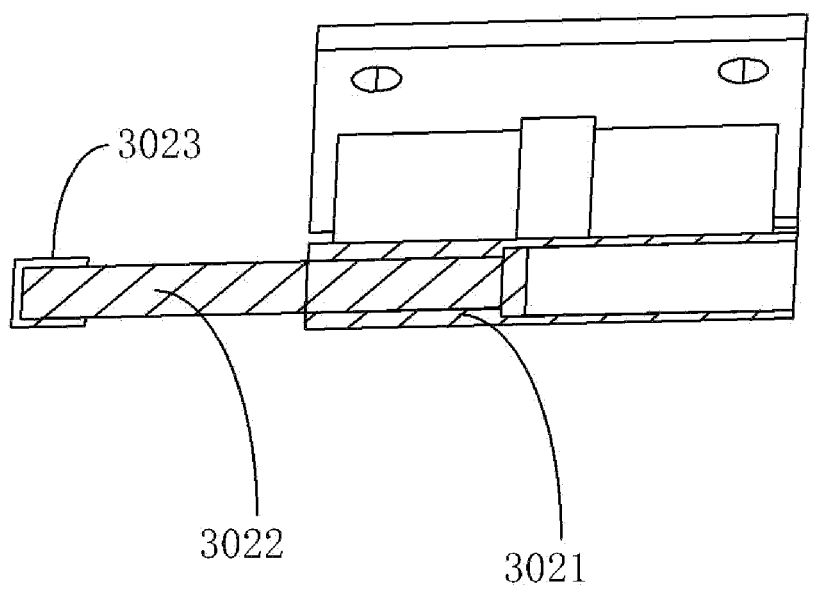
FIG. 17 is a partial cross-sectional view of the structure of FIG. 16.

In an embodiment, an annular boss is provided at the tail of the guide pole 3022, and an abutment platform as shown in FIG. 17 is formed inside a barrel of the sleeve 3021. The abutment platform cooperates with the annular boss to limit the predetermined length by which the guide pole 3022 protrudes out of the sleeve 3021. It should be noted that the elastic pressure head is sleeved at one end of the guide pole 3022 protruding from the sleeve 3021. When assembling the first pre-pressing assembly 302 provided by the embodiment of the present disclosure, one end of the guide pole 3022 without the annular boss may be inserted into the barrel of the sleeve 3021 from one side of the barrel of the sleeve 3021 with the larger aperture. After one end of the guide pole 3022 protrudes out of the sleeve 3021, the elastic pressure head is sleeved on one side of the guide pole 3022 protruding from the barrel of the sleeve 3021, and the other end of the sleeve 3021 is sealed by an end cover 3024 of the sleeve 3021. It should be noted that the barrel of the sleeve 3021 and the end cover 3024 may be detachably connected by using a fixing member 3026 as shown in FIG. 17.

In a specific embodiment, the guide pole 3022 is always in the pressing position. In other words, the guide pole 3022 always protrudes out of the barrel of the sleeve 3021 by a predetermined length. The first pre-pressing assembly 302 provided in this embodiment of the present disclosure further includes an elastic member abutting between the guide pole 3022 and the bottom portion of the sleeve 3021, and the elastic member is configured to adjust a predetermined length along the axis of the sleeve 3021. It should be noted that since the heights between the battery units 200 may be slightly different and not completely consistent along the third direction, an elastic member may be provided in the barrel to play a buffering role, so that the protruding height of the guide pole 3022 may be slightly adjusted when the guide pole 3022 presses against the first busbar 101.

It may be noted that the end cover 3024 may be an elastic material. It should be noted that the elastic material may cooperate with the elastic member to adjust the height of the guide pole 3022, so as to avoid a large force from being exerted between the elastic member and the end cover 3024, resulting in a large reverse force acting on the guide pole 3022 and damage to the first busbar 101.

In another specific embodiment, the guide pole 3022 has a lifting position in addition to a pressing position. It should be noted that the guide pole 3022 may be switched between the pressing position and the lifting position. When the guide pole 3022 is in the lifting position, the length by which the guide pole 3022 protruding out of the sleeve 3021 is less than a predetermined length. It should be noted that the structure in this specific embodiments may be applied to various scenarios. Specifically, when the assembly tool 300 is in an idle state, the guide pole 3022 is in the lifting position, and a large part of the guide pole 3022 is stored inside the sleeve 3021 to prevent the guide pole 3022 from being accidentally touched and damaged. When applying the assembly tool 300, the guide pole 3022 may be switched to the pressing position to realize the alignment and fixation of the first busbar 101 and the battery unit 200.

In an embodiment, the selective switching of the guide pole 3022 between the pressing position and the lifting position may be achieved through a drive assembly. Specifically, the assembly tool 300 for the busbar assembly 100 provided in the embodiment of the present disclosure further includes a drive assembly. Exemplarily, the drive assembly may be a gas compression assembly, and the gas compression assembly is connected to the first pre-pressing assembly 302 to realize the switching operation of the guide pole 3022 between the pressing position and the lifting position. Certainly, the drive assembly may also be set as other structures according to requirements, and the details will not be repeated here.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A busbar assembly, comprising: a first busbar, wherein the first busbar is configured to connect two adjacent battery units; and the first busbar includes:
   a first connection part, wherein the first connection part is configured to connect a first electrode terminal of one of the two adjacent battery units; and
   a second connection part, wherein the second connection part is configured to connect a second electrode terminal of the other one of the two adjacent battery units, and the second connection part and the first connection part are in staggered arrangement, to be configured to match a vertical distance between a lead surface of the second electrode terminal and a lead surface of the first electrode terminal located on a same side of the battery units,
   wherein the first busbar further comprises a bent part, and the bent part is configured to form a distance difference between the first connection part and the second connection part in staggered arrangement,
   the bent part is provided with a buffer structure for enhancing a structural strength of the bent part, and an extending direction of the bent part is changed to form the buffer structure,
   one side of the first connection part facing away from the buffer structure is provided with a notch structure, and a shape of the notch structure is adapted to a shape of the buffer structure,
   the first busbar is multiple in number, the plurality of first busbars are arranged in sequence, in two adjacent first busbars: the notch structure of the first connection part of the latter one of the plurality of first busbars matches the buffer structure of the former one of the plurality of first busbars, and a gap is defined between the notch structure and the buffer structure along an arrangement direction of the two first busbars.

2. The busbar assembly according to claim 1, wherein the bent part has an integrated structure with the first connection part and the second connection part.

3. The busbar assembly according to claim 2, wherein in the adjacent plurality of first busbars:
   the first connection part of a latter one of the plurality of first busbars is stacked with the second connection part of a former one of the plurality of first busbars, and the first connection part of the latter one of the plurality of first busbars is arranged in a same layer as the first connection part of the former one of the plurality of first busbars.

4. The busbar assembly according to claim 1, wherein the bent part extends to form the buffer structure, and the buffer structure protrudes from the first connection part to the second connection part.

5. The busbar assembly according to claim 4, wherein in the adjacent plurality of first busbars:
   the first connection part of a latter one of the plurality of first busbars is stacked with the second connection part of a former one of the plurality of first busbars, and the first connection part of the latter one of the plurality of first busbars is arranged in a same layer as the first connection part of the former one of the plurality of first busbars.

6. The busbar assembly according to claim 1, wherein in the adjacent plurality of first busbars:
   the first connection part of a latter one of the plurality of first busbars is stacked with the second connection part of a former one of the plurality of first busbars, and the first connection part of the latter one of the plurality of first busbars is arranged in a same layer as the first connection part of the former one of the plurality of first busbars.

7. The busbar assembly according to claim 1, further comprising an insulating structure, wherein at least a part of the insulating structure is located between the second connection part of the former one of the plurality of first busbars and the first connection part of the latter one of the plurality of first busbars.

8. The busbar assembly according to claim 7, wherein the insulating structure is further provided between the buffer structure of the former one of the plurality of first busbars and the notch structure of the latter one of the plurality of first busbars.

9. The busbar assembly according to claim 8, further comprising a second busbar and a third busbar, wherein,
   the second busbar is configured to connect a same one of the battery units with the adjacent first busbar; the first busbar is configured to connect the first electrode terminal of the battery unit; the second busbar is configured to connect the second electrode terminal of the battery unit, and the second busbar comprises a first output part, the first output part is disposed on one side of the first connection part of the first busbar facing the second connection part, and the first output part is disposed opposite to the first connection part;
   the third busbar is configured to connect a same one of the battery units with another adjacent first busbar; the first busbar is configured to connect the second electrode terminal of the battery unit; the third busbar is configured to connect the first electrode terminal of the battery unit, and the third busbar comprises a second output part, the second output part is disposed on one side of the second connection part of the adjacent first busbar facing the first connection part, and the second output part is disposed opposite to the second connection part.

10. A battery pack, comprising the busbar assembly as claimed in claim 9 and battery units, wherein,
    each the battery units has a first electrode terminal and a second electrode terminal, and a lead surface of the first electrode terminal and a lead surface of the second electrode terminal are located on a same side and are not coplanar;
    in the busbar assembly, the first connection part of the first busbar is connected to the lead surface of the first electrode terminal, and the second connection part of the first busbar is connected to the lead surface of the second electrode terminal, the first connection part and the second connection part are in staggered arrangement to adapt to a vertical distance between the lead surface of the first electrode terminal and the lead surface of the second electrode terminal.

11. The battery pack according to claim 10, wherein each of the battery units comprises at least one battery, and the battery is a cylindrical battery, and the battery comprises a housing and a pole protruding from the housing, wherein the pole serves as the first electrode terminal, and an end surface of the pole protruding from the housing and away from the battery serves as the lead surface of the first electrode terminal;

the housing serves as the second electrode terminal, and an end surface of the housing, corresponding to the pole protruding from the housing, serves as the lead surface of the second electrode terminal.

12. The battery pack according to claim 11, wherein in the first busbar,
the first connection part is provided with a contoured structure, the contoured structure is adapted to a shape of the first electrode terminal, and the first connection part abuts against the lead surface of the first electrode terminal through the contoured structure;
the second connection part is provided with a through hole, the first electrode terminal passes through the through hole, and the second connection part abuts against the lead surface of the second electrode terminal.

13. The battery pack according to claim 12, wherein a diameter of the through hole provided in the second connection part is larger than a diameter of the pole.

14. The busbar assembly according to claim 1, further comprising a second busbar and a third busbar, wherein
the second busbar is configured to connect a same one of the battery units with the adjacent first busbar; the first busbar is configured to connect the first electrode terminal of the battery unit; the second busbar is configured to connect the second electrode terminal of the battery unit, and the second busbar comprises a first output part, the first output part is disposed on one side of the first connection part of the first busbar facing the second connection part, and the first output part is disposed opposite to the first connection part;
the third busbar is configured to connect a same one of the battery units with the adjacent first busbar; the first busbar is configured to connect the second electrode terminal of the battery unit; the third busbar is configured to connect the first electrode terminal of the battery unit, and the third busbar comprises a second output part, the second output part is disposed on one side of the second connection part of the adjacent first busbar facing the first connection part, and the second output part is disposed opposite to the second connection part.

15. A battery pack, comprising the busbar assembly as claimed in claim 1 and battery units, wherein,
each of the battery units has a first electrode terminal and a second electrode terminal, and a lead surface of the first electrode terminal and a lead surface of the second electrode terminal are located on a same side and are not coplanar;
in the busbar assembly, the first connection part of the first busbar is connected to the lead surface of the first electrode terminal, and the second connection part of the first busbar is connected to the lead surface of the second electrode terminal, the first connection part and the second connection part are in staggered arrangement to adapt to a vertical distance between the lead surface of the first electrode terminal and the lead surface of the second electrode terminal.

16. An assembling method of a busbar assembly, for assembling the busbar assembly as claimed in claim 1, the assembling method comprising: using the first busbar to connect the two adjacent battery units, wherein the step of using the first busbar to connect the two adjacent battery units comprises:
connecting the first connection part of the first busbar to the lead surface of the first electrode terminal of one of the battery units, and connecting the second connection part of the first busbar to the lead surface of the second electrode terminal of the other one of the battery units, such that the first connection part and the second connection part in staggered arrangement match the vertical distance between the lead surface of the second electrode terminal and the lead surface of the first electrode terminal on the same side of the battery units.

17. The assembling method of the busbar assembly according to claim 16, wherein when each of the battery units comprises at least one battery and the battery is a cylindrical battery, the step of using the first busbar to connect the two adjacent battery units further comprises:
allowing a pole serving as the first electrode terminal in one of the battery units to pass through the second connection part, to connect the second connection part and an end surface of a housing serving as the second electrode terminal, and to form a current to-be-connected unit;
connecting the first connection part of the first busbar in the current to-be-connected unit to an end surface of the pole serving as the first electrode terminal in a former to-be-connected unit, such that the first connection part of the first busbar in the current to-be-connected unit and the second connection part of the first busbar in the former to-be-connected unit are connected to a same one of the battery units.

18. The assembling method of the busbar assembly according to claim 17, wherein before connecting the first connection part of the first busbar in the current to-be-connected unit to the end surface of the pole serving as the first electrode terminal in the former to-be-connected unit, the method further comprises:
forming an insulating structure between the second connection part in the former to-be-connected unit and the first connection part in the current to-be-connected unit.

19. The assembling method of the busbar assembly according to claim 17, wherein before the step of using the first busbar to connect the two adjacent battery units, the method further comprises:
forming an insulating structure on one side, facing the battery unit, of the first connection part of the first busbar; or,
forming an insulating structure on one side, facing away from the battery unit, of the second connection part of the first busbar.

20. The assembling method of the busbar assembly according to claim 17, wherein before the step of using the first busbar to connect the two adjacent battery units, the method further comprises:
abutting a first output part of a second busbar against the end surface of the housing in one of the battery units, such that the pole in the one of the battery units penetrates a through hole on the first output part to form the former to-be-connected unit;
connecting the first busbar to the other one of the battery units to form the current to-be-connected unit;
abutting the first connection part in the current to-be-connected unit against the end surface of the pole in the former to-be-connected unit, such that the first connection part of the first busbar and the first output part of the second busbar are connected to a same one of the battery units.

21. The assembling method of the busbar assembly according to claim 20, wherein after the step of using the first busbar to connect the two adjacent battery units, the method further comprises:
   abutting a second output part of a third busbar against an end surface of a pole in a to-be-connected unit formed by the first busbar and the one of the battery units, such that the second output part of the third busbar and the second connection part of the first busbar are connected to the same one of the battery units.

22. An assembly tool for a busbar assembly, the assembly tool comprising: a bracket and a first pre-pressing assembly and a second pre-pressing assembly provided on the bracket, wherein
   the first pre-pressing assembly has a first pre-pressing surface, and the first pre-pressing surface is configured to pre-press a first connection part of a first busbar on a lead surface of a first electrode terminal of one of adjacent battery units;
   the second pre-pressing assembly has a second pre-pressing surface, and the second pre-pressing surface is configured to pre-press a second connection part of the first busbar on a lead surface of a second electrode terminal of the other one of the adjacent battery units;
   the second pre-pressing surface and the first pre-pressing surface are in staggered arrangement, and a distance between the first pre-pressing surface and the second pre-pressing surface is adapted to a distance between the first connection part and the second connection part of the first busbar.

23. The assembly tool for the busbar assembly according to claim 22, wherein the bracket comprises an annular frame having an accommodating cavity for accommodating the first busbar, and the annular frame is adapted to a shape of the first busbar.

24. The assembly tool for the busbar assembly according to claim 23, wherein the assembly tool is configured to assemble the battery units formed by cylindrical batteries and the busbar assembly; the annular frame has a notch, and the notch is configured to match a vertical difference between an end surface of a housing serving as the lead surface in the battery units and an end surface of a pole serving as the another lead surface.

25. The assembly tool for the busbar assembly according to claim 24, wherein a buffer structure is provided on one side of the annular frame facing the battery units.

26. The assembly tool for the busbar assembly according to claim 25, wherein at least one of the first pre-pressing assembly and the second pre-pressing assembly comprises:
   a sleeve, wherein the sleeve is fixed relative to the bracket, and one end of the sleeve has an opening;
   a guide pole, wherein the guide pole at least partially passes through the sleeve; the guide pole has a pressing position, and when the guide pole is at the pressing position, one end of the guide pole protrudes out of the sleeve from the opening by a predetermined length; and
   an elastic pressure head, arranged at the end of the guide pole protruding out of the sleeve, and configured to press the first busbar.

27. The assembly tool for the busbar assembly according to claim 26, further comprising an elastic member abutting between the guide pole and a bottom portion of the sleeve, wherein the elastic member is configured to adjust the predetermined length along an axis of the sleeve.

28. The assembly tool for the busbar assembly according to claim 26, wherein the guide pole further has a lifting position, when the guide pole is in the lifting position, a length by which the guide pole protruding out of the sleeve is less than the predetermined length.

29. The assembly tool for the busbar assembly according to claim 28, further comprising a drive assembly, where in the drive assembly is configured to drive the guide pole to switch between the pressing position and the lifting position.

* * * * *